US012052145B2

(12) United States Patent
Vandikas et al.

(10) Patent No.: US 12,052,145 B2
(45) Date of Patent: Jul. 30, 2024

(54) PREDICTING NETWORK COMMUNICATION PERFORMANCE USING FEDERATED LEARNING

(71) Applicant: Telefonaktiebolaget LM Ericsson (publ), Stockholm (SE)

(72) Inventors: Konstantinos Vandikas, Solna (SE); Selim Ickin, Stocksund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 17/299,152

(22) PCT Filed: Dec. 6, 2019

(86) PCT No.: PCT/EP2019/083965
§ 371 (c)(1),
(2) Date: Jun. 2, 2021

(87) PCT Pub. No.: WO2020/115273
PCT Pub. Date: Jun. 11, 2020

(65) Prior Publication Data
US 2022/0052925 A1    Feb. 17, 2022

Related U.S. Application Data

(60) Provisional application No. 62/777,059, filed on Dec. 7, 2018.

(51) Int. Cl.
*H04L 41/147* (2022.01)
*G06F 18/214* (2023.01)
*G06N 3/04* (2023.01)
(52) U.S. Cl.
CPC ........ *H04L 41/147* (2013.01); *G06F 18/2148* (2023.01); *G06N 3/04* (2013.01)

(58) Field of Classification Search
CPC ................. H04L 41/147; G06N 3/04
(Continued)

(56) References Cited

U.S. PATENT DOCUMENTS

| 10,043,071 B1* | 8/2018 | Wu ..................... G06V 30/413 |
| 2013/0311673 A1* | 11/2013 | Karthikeyan ........... H04L 45/00 |
| | | 709/239 |

(Continued)

FOREIGN PATENT DOCUMENTS

| WO | 2018057302 A1 | 3/2018 | |
| WO | WO-2018057302 A1 * | 3/2018 | ............. G06F 17/12 |

OTHER PUBLICATIONS

Konečný, Jakub, et al., "Federated Learning: Strategies for Improving Communication Efficiency", ICLR 2018 Conference Blind Submission, Feb. 15, 2018, 1-11.

*Primary Examiner* — Suraj M Joshi
(74) *Attorney, Agent, or Firm* — Murphy, Bilak & Homiller, PLLC

(57) ABSTRACT

Federated learning is used to predict network communication performance at an edge node (10-1). The edge node (10-1) trains a local model (14-1) of network communication performance over one or more rounds of training, based on a local training dataset (22-1) and based on multi-node training information (20-1) received in each round of training. This information (20-1) comprises information about local models (14-2, . . . 14-N) at other respective edge nodes (10-2, . . . 10-N) as trained based on local training datasets at the other edge nodes (10-2, . . . 10-N). After or as part of each round of training, the edge node (10-1) transmits control signaling that indicates an accuracy of the local model (14-1) as trained through that round of training, that indicates whether another round of training is needed or desired, and/or that indicates whether any further information (20-1) is needed or desired. The edge node (10-1)

(Continued)

predicts network communication performance at the edge node (10-1) based on the trained local model (14-1).

20 Claims, 24 Drawing Sheets

(58) Field of Classification Search
USPC .......................................................... 709/224
See application file for complete search history.

(56) References Cited

U.S. PATENT DOCUMENTS

| 2015/0080008 | A1* | 3/2015 | Ngai ................. H04W 72/1215 |
| | | | 455/452.2 |
| 2017/0220949 | A1* | 8/2017 | Feng ....................... H04L 41/16 |
| 2017/0353991 | A1 | 12/2017 | Tapia |
| 2019/0325302 | A1* | 10/2019 | Savic .................... G06N 3/0454 |
| 2019/0340534 | A1* | 11/2019 | McMahan ............... G06F 17/18 |

* cited by examiner

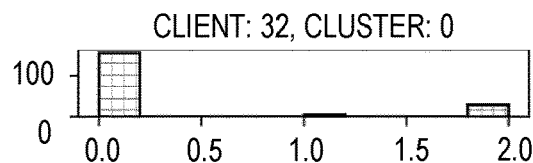
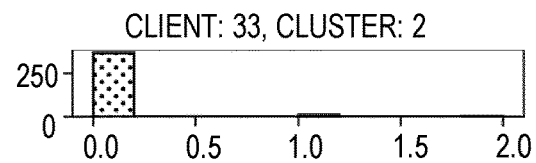
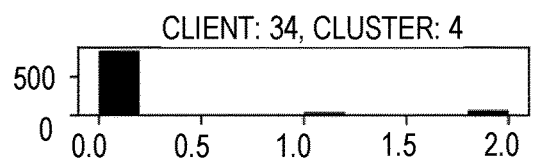
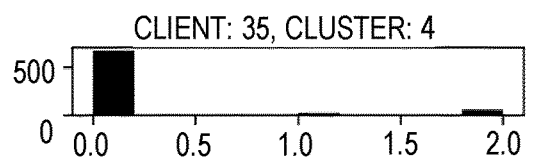
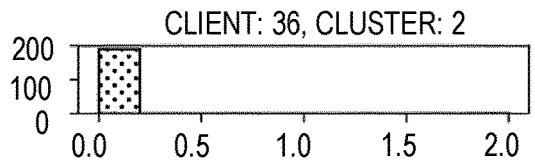
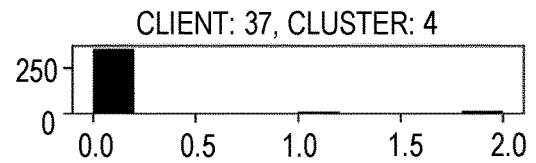
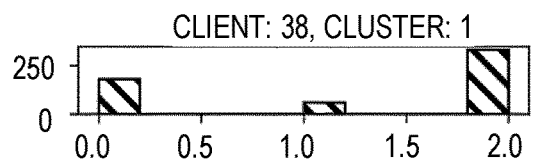
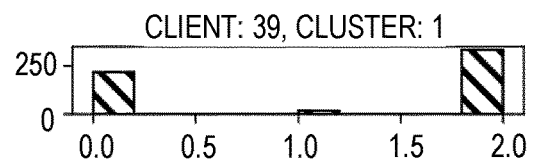
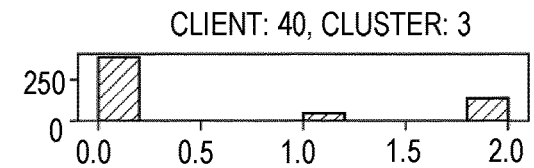
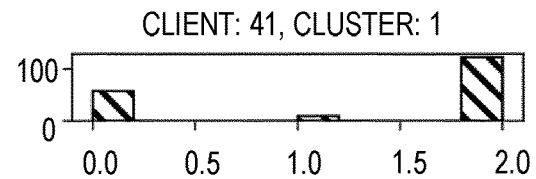
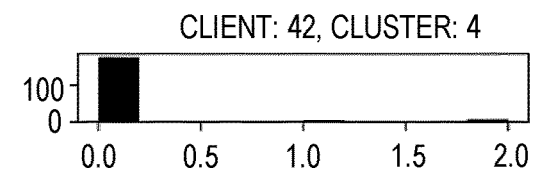
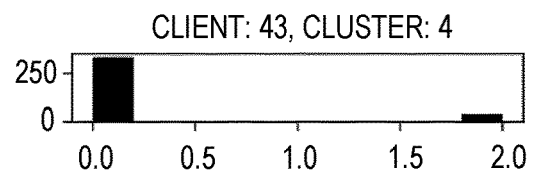
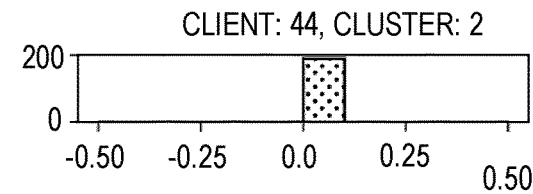
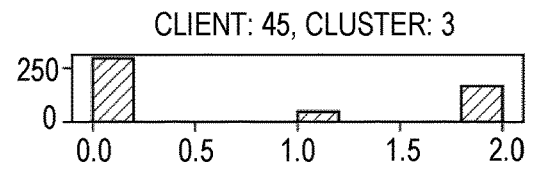
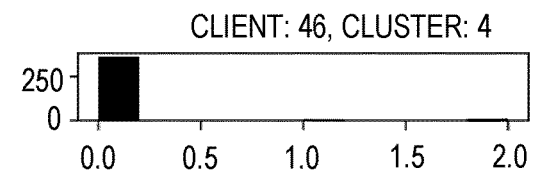
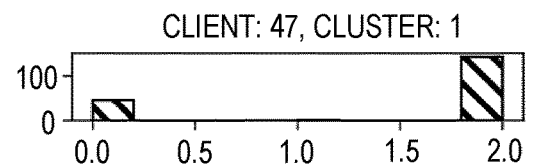
*FIGURE 18C*

PREDICTING NETWORK COMMUNICATION PERFORMANCE USING FEDERATED LEARNING

TECHNICAL FIELD

The present application relates generally to network communication performance, and relates more particularly to predicting network communication performance using federated learning.

BACKGROUND

The state-of-the-art typical approaches applied for predicting Key Performance Indicators (KPIs) for base stations require collecting a lot of data in a centralized data repository. This is needed since a lot of information is used to create reliable models that can properly predict when a KPI is going to deteriorate. Examples of KPIs in this case include (but are not limited to) latency (response time between base station and user equipment, UE) and throughput. Predicting KPIs is usually accompanied with an approach to "actuation", a way of sending some command to the base station in order to be able to react to the problematic situation (the KPI degrading) and alleviate the root cause of the problem. In the case of latency, actuation may include changing the uplink/downlink transmission power to minimize interference between the cells causing the issue.

There currently exist certain challenge(s). One limitation with this approach is that it requires a lot of information to be transferred in the cloud which in some cases may not be possible for two reasons: (1) Links between the base stations and the cloud may not have the bandwidth to carry the amount of information that is needed; and (2) Data geofencing regulations may not permit for any data to leave the country where it was generated.

These limitations (when present) effectively rule out the possibility of developing any solution that can leverage historical information for predicting KPI degradations. Local data centers (if they exist) can be used to develop such approaches within the geographical region that suffers from these limitations. However, such approaches become difficult to maintain over time and cannot benefit from any other information collected in other regions or other base stations.

Federated Learning allows for treating these limitations. However, one problem with some approaches to Federated Learning is that the approaches cannot be applied directly to KPI degradation. This is because they assume that all sites will always receive a random distribution of events, meaning they can always benefit from the input received by any other site. In practice, this may not be the case since sites are very much bound to their surroundings and can only benefit from information coming from other very similar sites.

SUMMARY

Some embodiments herein demonstrate a more disciplined approach towards Federated Learning which can be applied to non-random distributions of data and achieve on-par accuracy as the same models trained using completely centralized sets of data. In particular, some embodiments train the sites in a federated manner such that the individual sites train on their own dataset and only share weights with the centralized node that averages all the weights received from multiple nodes. In some embodiments, each site aims to maximize the prediction accuracy via one or more methods, including (a) by monitoring the accuracy of an individual site model and stop training and stop sharing weights when a saturation on a node is reached; and/or (b) by running the averaging on the edge, such as by broadcasting back the weights to the edge so that the edge can use the weights that yield the best combination. However, (b) may be computationally intensive (e.g., with a grid search), and might bring additional overload to the edges. Accordingly, some embodiments present methods to overcome the computation overhead.

More particularly, some embodiments herein include a method for using federated learning to predict network communication performance at an edge node in an edge communication network. The method is performed by the edge node and comprises training a local model of network communication performance over one or more rounds of training at the edge node, based on a local training dataset at the edge node and based on multi-node training information received in each round of training. The multi-node training information may comprise information about local models at other respective edge nodes as trained based on local training datasets at the other edge nodes. Regardless, the method may further include, after or as part of each round of training, transmitting control signaling that indicates an accuracy of the local model as trained by the edge node through that round of training, that indicates whether another round of training is needed or desired at the edge node, and/or that indicates whether any further multi-node training information is needed or desired at the edge node. The method may also include predicting network communication performance at the edge node based on the trained local model.

In some embodiments, the method may further comprise performing one or more remedial or preventative measures to account for the network communication performance at the edge node being predicted to decrease. Performing one or more remedial or preventative measures may for example include adjusting a transmission power of the edge node.

In some embodiments, the control signaling indicates whether another round of training is needed or desired at the edge node and/or indicates whether any further update information is needed or desired at the edge node. In this case, the method may further comprise, for each of the one or more rounds of training: determining, based on at least the accuracy of the local model as trained by the edge node through that round of training, whether one or more conditions are met for stopping training of the local model at the edge node; and generating the control signaling to indicate that another round of training and/or further update information is not, or is, needed or desired at the edge node, depending respectively on whether or not the one or more conditions are met. For example, the one or more conditions may include the accuracy of the local model reaching an accuracy threshold and/or improving by less than a minimum incremental improvement threshold since one or more previous rounds of training. Alternatively or additionally, the control signaling may indicate that the edge node does not need or desire another round of training and/or any further update information and further indicates for how long the edge node does not need or desire another round of training and/or any further update information.

In some embodiments, the control signaling indicates an accuracy of the local model as trained by the edge node through that round of training. In this case, the control signaling may indicate the accuracy of the local model with respect to a local test dataset at the edge node.

In some embodiments, the multi-node training information includes a combination of local updates that the other edge nodes respectively made to local models at the other edge nodes.

In some embodiments, the multi-node training information includes, for each of multiple other edge nodes, a local update that the other edge node made to a local model at the other edge node. In this case, for each of the one or more rounds of training, said training may further comprise: deciding which one or more of the local updates to combine with one another, and/or with a local update determined by the edge node based on the local training dataset at the edge node, into a combined update, and updating the local model at the edge node based on the combined update.

In some embodiments, the local model at the edge node is a model of a predicted level of degradation in one or more key performance indicators that indicate network communication performance in the edge communication network. In one such embodiment, the local model at the edge node maps the one or more key performance indicators as input to an output in the form of a multiclass label that represents the predicted level of degradation in the one or more key performance indicators, where the multiclass label has multiple possible values associated with different predicted levels of degradation in the one or more key performance indicators.

In some embodiments, the local model at the edge node and the local models at the other edge nodes are each a neural network model, and a local update to a neural network model includes an updated weight matrix.

Embodiments herein also include a method performed by a server for coordinating training of local models of network communication performance at respective edge nodes. The method may comprise, for each of one or more rounds of training, transmitting, to one or more of the edge nodes, multi-node training information that comprises information about local models at respective edge nodes as trained based on local training datasets at the edge nodes. The method may further comprise, for each of the one or more rounds of training, receiving, from one or more of the edge nodes, control signaling that indicates an accuracy of the local model at the edge node as trained through the round of training, that indicates whether another round of training is needed or desired at the edge node, and/or that indicates whether any further multi-node training information is needed or desired at the edge node. The method may also comprise, for each of the one or more rounds of training, controlling generation of or transmission of multi-node training information in any next round of training based on the received control signaling.

In some embodiments, the control signaling indicates whether another round of training is needed or desired at the edge node and/or indicates whether any further update information is needed or desired at the edge node.

In some embodiments, the control signaling indicates that the edge node does not need or desire another round of training and/or any further update information and further indicates for how long the edge node does not need or desire another round of training and/or any further update information.

In some embodiments, said controlling comprises transmitting or not transmitting multi-node training information to an edge node in a next round of training, depending respectively on whether or not the control signaling from the edge node indicates that the edge node needs or desires the further multi-node training information or another round of training.

In some embodiments, the control signaling indicates the accuracy of the local model at the edge node as trained through the round of training. In this case, said controlling may comprise: determining, based on at least the accuracy indicated by the control signaling received from an edge node, whether one or more conditions are met for stopping training of the local model at the edge node; and refraining from transmitting, or transmitting, further multi-node training information to the edge node in a next round of training, depending respectively on whether or not the one or more conditions are met. In one embodiment, the one or more conditions include the accuracy of the local model reaching an accuracy threshold and/or improving by less than a minimum incremental improvement threshold since one or more previous rounds of training.

In some embodiments, the local model at each edge node is a model of a predicted level of degradation in one or more key performance indicators that indicate network communication performance at the edge node. In one such embodiment, the local model at each edge node maps the one or more key performance indicators as input to an output in the form of a multiclass label that represents the predicted level of degradation in the one or more key performance indicators, where the multiclass label has multiple possible values associated with different predicted levels of degradation in the one or more key performance indicators.

In some embodiments, the multi-node training information includes a combination of local updates that the respective edge nodes respectively made to local models at the edge nodes.

In some embodiments, the local model at each edge node is a neural network model, and a local update to a neural network model includes an updated weight matrix.

Embodiments herein also include corresponding apparatus, computer programs, and carriers. For example, embodiments herein include an edge node for using federated learning to predict network communication performance at the edge node in an edge communication network. The edge node is configured (e.g., via communication circuitry and processing circuitry) to train a local model of network communication performance over one or more rounds of training at the edge node, based on a local training dataset at the edge node and based on multi-node training information received in each round of training. The multi-node training information may comprise information about local models at other respective edge nodes as trained based on local training datasets at the other edge nodes. Regardless, the edge node may further be configured to, after or as part of each round of training, transmit control signaling that indicates an accuracy of the local model as trained by the edge node through that round of training, that indicates whether another round of training is needed or desired at the edge node, and/or that indicates whether any further multi-node training information is needed or desired at the edge node. The edge node may also be configured to predict network communication performance at the edge node based on the trained local model. In some embodiments, the edge node may be further configured to perform one or more remedial or preventative measures to account for the network communication performance at the edge node being predicted to decrease.

Embodiments herein further include a server for coordinating training of local models of network communication performance at respective edge nodes. The server may be configured to, for each of one or more rounds of training, transmit, to one or more of the edge nodes, multi-node training information that comprises information about local models at respective edge nodes as trained based on local training datasets at the edge nodes. The server may also be configured to, for each of the one or more rounds of training, receive, from one or more of the edge nodes, control signaling that indicates an accuracy of the local model at the edge node as trained through the round of training, that indicates whether another round of training is needed or desired at the edge node, and/or that indicates whether any further multi-node training information is needed or desired at the edge node. The server may also be configured to, for each of the one or more rounds of training, control generation of or transmission of multi-node training information in any next round of training based on the received control signaling.

In some particular implementations, base stations learn and improve the machine learning models without committing or sending any raw data; instead each base station or a communication node trains a machine learning model and the models evolve only by sharing the trained/learned model weights. This helps to reduce the raw data transfer costs, protecting privacy by transmitting rather low volume model weights. Some embodiments also propose various mechanisms to customize the models at each node to maximize model accuracy.

Certain embodiments may provide one or more of the following technical advantage(s). One advantage is lower latency. Trained models can learn from other sites but models (inference) take place as close as possible to where the data is generated. Contrary to a centralized deployment where inference would have taken place in a data center, this significantly improves performance for actuation since potential issues can be detected locally and thus immediately trigger any resolution needed.

Another advantage concerns security/privacy aspects. Data never really leaves the site—training is copied in the form of some abstract model, i.e. set of weights obtained when the model is retrained.

Yet another advantage is reduced data transfer cost. It is often that the data size to run network performance related use cases is massive, thus the proposed solution prevents high data transfer costs.

A further advantage is speed of data transfer. It is often that uploads are slower than downloads. Thus, reducing the upload volume will drastically reduce the upload bandwidth requirements.

Some embodiments also have minimum impact of data transfer on the uplink. Since the data upload size is reduced significantly by not sending a large volume of data from the edge, the impact of the data upload on the traffic utilization on the network itself is minimized, thus the bandwidth can be utilized by the base station.

There are also further improvements in model accuracy via smart updating of the edge models via various approaches. When nodes converge in accuracy, the nodes notify the central node in order not to receive updated weights anymore. This way, the redundant signalling is reduced. Moreover, the central node collects all updates from every node and broadcasts all weights back to the edge. Every node in the edge runs weighted averaging maximizing the accuracy, i.e. via grid search. The nodes can choose the weights that would benefit the edge accuracy.

DETAILED DESCRIPTION

Figure 1:
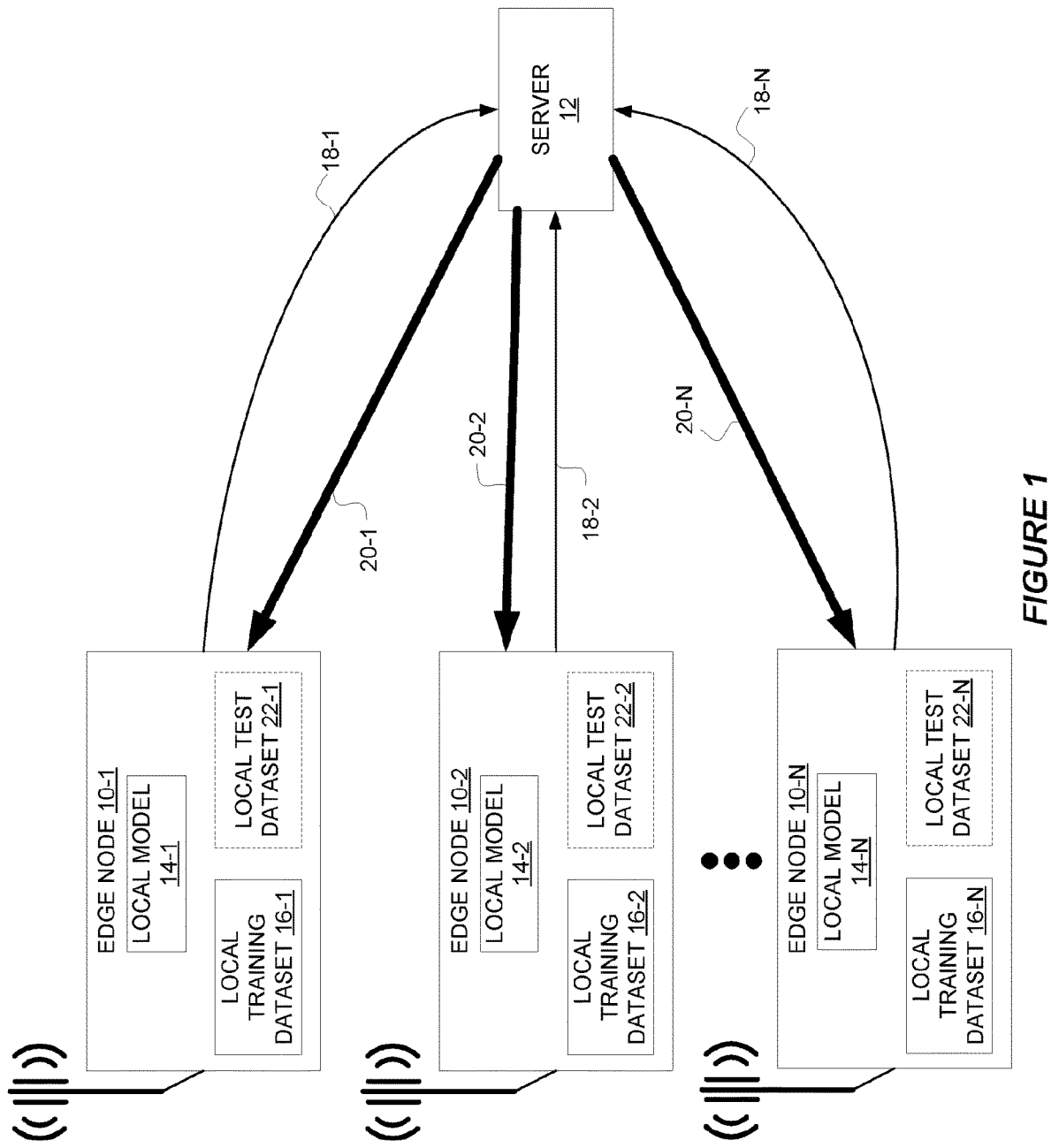
FIG. 1 is a block diagram of edge nodes in edge communication network(s) according to some embodiments.

FIG. 1 shows multiple edge nodes 10-1, 10-2, . . . 10-N (e.g., base stations) in one or more edge communication networks (e.g., radio access network(s)). The edge nodes 10-1, 10-2, . . . 10-N (generally referred to hereinafter as edge nodes 10) are configured to predict the network communication performance at each edge node. The network communication performance may for instance be represented in terms of certain key performance indicators, KPIs, such as processing delay of downlink packets, number of radio bearers with poor quality of service (Qos), number of abnormal radio bearer releases, etc. Regardless, if the performance is predicted to decrease at an edge node, remedial or preventative measures may be taken as needed to account for (e.g., mitigate or prevent) the predicted performance decrease. These measures may include for example transmission power adjustments to minimize interference between edge nodes 10.

In order to predict network communication performance, each edge node 10-1, 10-2, . . . 10-N stores its own respective local model 14-1, 14-2, . . . 14-N of network communication performance at the edge node, as well as its own respective local training dataset 16-1, 16-2, . . . 16-N. Each edge node 10-1, 10-2, . . . 10-N trains its respective local model 14-1, 14-2, . . . 14-N over one or more rounds of training at the edge node. The training of each edge node's local model 14-1, 14-2, . . . 14-N is based on the local training dataset 16-1, 16-2, . . . 16-N at that edge node, respectively. The edge nodes 10 thereby exploit local training datasets to locally perform model training at the edge.

Rather than training their local models in isolation, though, the edge nodes 10 collaborate with one another, directly in a peer-to-peer fashion and/or indirectly via server 12, so as to engage in federated learning, e.g., in order that an edge node benefits from the training performed at one or more other edge nodes. Each edge node may therefore train its local model based not only on its local training dataset but also on so-called multi-node training information that the edge node receives in each round of training. In some embodiments, this multi-node training information comprises information about local models at multiple edge nodes as trained based on local training datasets at those edge nodes.

For example, in some embodiments as shown in FIG. 1, each edge node 10-1, 10-2, . . . 10-N, after or as part of each round of training, transmits information 18-1, 18-2, . . . 18-N to the server 12 about its local model 14-1, 14-2, . . . 14-N as trained (based on its local training dataset) through that round of training. The information 18-1, 18-2, . . . 18-N may for instance take the form of a local update to the local model of the edge node, e.g., indicating how the local model has been updated in that round of training. Where, for example, the local models are neural network models, the information may constitute weights of the model or updates to such weights. Regardless, the server 12 generates multi-node training information 20-1, 20-2, . . . 20-N based on the information 18-1, 18-2, . . . 18-N received from the edge nodes and transmits that multi-node training information towards the edge nodes.

In some embodiments, the multi-node training information 20-1, 20-2, . . . 20-N is a combination of (e.g., average of) the information 18-1, 18-2, . . . 18-N received from multiple ones of the edge nodes. Where the information 18-1, 18-2, . . . 18-N takes the form of weights, for instance, the multi-node training information 20-1, 20-2, . . . 20-N may take the form of averaged weights. In any event, the multi-node training information 20-1, 20-2, . . . 20-N in some embodiments is a combination of the information 18-1, 18-2, . . . 18-N received from all of the edge nodes. In this case, the multi-node training information transmitted to any given edge node may be the same as the multi-node training information transmitted to any other edge node, i.e., information 20-1 is the same as information 20-2 and 20-N. In other embodiments, though, the multi-node training information 20-$n$ transmitted to a certain edge node 10-$n$ is a combination of the information 18-$n$ received from a subset or portion of the edge nodes. This subset or portion of edges nodes may for instance include edge nodes that are grouped into the same one of multiple different clusters formed from the edge nodes, e.g., based on those edge nodes having characteristics that are most similar to one another. In this case, then, the multi-node training information transmitted to different respective clusters may be cluster-specific.

In yet other embodiments, the multi-node training information 20-1, 20-2, . . . 20-N is simply the information 18-1, 18-2, . . . 18-N received from multiple ones of the edge nodes, e.g., as relayed by the server 12. Where the information 18-1, 18-2, . . . 18-N takes the form of weights, for instance, the multi-node training information 20-1, 20-2, . . . 20-N may take the form of those same weights (i.e., not averaged weights). In any event, the multi-node training information 20-1, 20-2, . . . 20-N in some embodiments is the information 18-1, 18-2, . . . 18-N received from all of the edge nodes. In this case, the multi-node training information transmitted to any given edge node may be the same as the multi-node training information transmitted to any other edge node, i.e., information 20-1 is the same as information 20-2 and 20-N. In other embodiments, though, the multi-node training information 20-$n$ transmitted to a certain edge node 10-$n$ is the information 18-$n$ received from a subset or portion of the edge nodes. This subset or portion of edges nodes may for instance include edge nodes that are grouped into the same one of multiple different clusters formed from the edge nodes, e.g., based on those edge nodes having characteristics that are most similar to one another. In this case, then, the multi-node training information transmitted to different respective clusters may be cluster-specific. Any given edge node may accordingly train its local model based on this multi-node training information. In some embodiments, for instance, an edge node (rather than the server 12) decides which information (e.g., which one or more local updates from other edge nodes) to combine with one another, and/or with information (e.g., a local update) determined by the edge node itself, into a combined update, and then updates its local model based on that combined update. In these embodiments, then, the combining (e.g., averaging) takes place at the edge rather than centrally at the server 12, e.g., so as to exploit knowledge at the edge regarding which information (e.g., local updates) best fits and/or maximizes accuracy at the edge (e.g., with respect to a local test dataset at each edge node).

No matter the particular nature of the multi-node training information, though, when the multi-node training information is generated on a cluster by cluster basis, the server 12 may group multiple edge nodes into different clusters based on, for each of the edge nodes, one or more characteristics of the edge node and/or of a local training dataset at the edge node. The one or more characteristics of an edge node may include one or more of: a geographic location of the edge node; a deployment type of the edge node; an overall network quality at the edge node; a configuration of the edge node; or a statistical measure of a number of subscribers served by the edge node. The one or more characteristics of the local training dataset at an edge node may include one or more of: a statistical distribution of labels assigned to respective instances of the local training dataset; or a statistical distribution of labels assigned to each instance of the local training dataset. The server 12 in some embodiments receives, from each of the multiple edge nodes, control signaling that indicates the one or more characteristics of the edge node and/or of the local training dataset at the edge node. The edge nodes may for instance transmit such control signaling to the server 12 prior to or during the first round of training. Regardless, the server 12 in some embodiments may group into the same cluster edge nodes whose one or more characteristics indicated by the received control signaling are most similar. Similarity between the one or more characteristics for different edge nodes may for instance be defined according to a distance metric, e.g., a Eucleadean metric or a Manhattan metric.

Alternatively or additionally to the embodiments above, other embodiments herein narrowly tailor the number of rounds of training undertaken to the number of rounds needed to reach a desired model accuracy and/or the number of rounds beyond which model accuracy improves only marginally. This may advantageously avoid needless rounds of training, which may in turn avoid unnecessary control signaling overhead and processing resources.

In some embodiments in this regard, an edge node, after or as part of each round of training, transmits control signaling (e.g., to the server 12 or other edge node(s)) that indicates an accuracy of the local model as trained by the edge node through that round of training, that indicates whether another round of training is needed or desired at the edge node, and/or that indicates whether any further multi-node training information is needed or desired at the edge node. Where the control signaling indicates whether another round of training is needed or desired at the edge node, the edge node may for instance, for each of the one or more rounds of training determine, based on at least the accuracy of the local model as trained by the edge node through that round of training, whether one or more conditions are met for stopping training of the local model at the edge node. The conditions may include for instance the accuracy of the local model reaching an accuracy threshold and/or improving by less than a minimum incremental improvement threshold since one or more previous rounds of training. Regardless, the edge node may then generate the control signaling to indicate that another round of training and/or further update information is not, or is, needed or desired at the edge node, depending respectively on whether or not the one or more conditions are met.

In other embodiments where the control signaling indicates the accuracy through a round of training, the server 12 may engage in a similar determination as to whether any further round of training is performed. Where no further round of training is performed for training the local model at a certain edge node, the server 12 may refrain from transmitting any multi-node training information to that certain edge node and/or the certain edge node may refrain from transmitting any training information to the server 12.

Note that the accuracy of the local model as trained by an edge node may be with respect to a local test dataset at the edge node, as shown in FIG. 1.

In some embodiments, the local model at each edge node is a model of a predicted level of degradation in one or more key performance indicators that indicate network communication performance at the edge node. For example, in one embodiment, the local model at each edge node maps the one or more key performance indicators as input to an output in the form of a multiclass label that represents the predicted level of degradation in the one or more key performance indicators. The multiclass label has multiple possible values associated with different predicted levels of degradation in the one or more key performance indicators.

Alternatively or additionally, in some embodiments, the local model at each edge node is a neural network model. In this case, a local update to a neural network model includes an updated weight matrix.

Although some embodiments were illustrated as being accomplished with coordination via server 12, other embodiments herein extend to peer-to-peer cooperation via direct peer-to-peer interaction between edge nodes, e.g., instead of or in addition to interaction with server 12.

Figure 2:
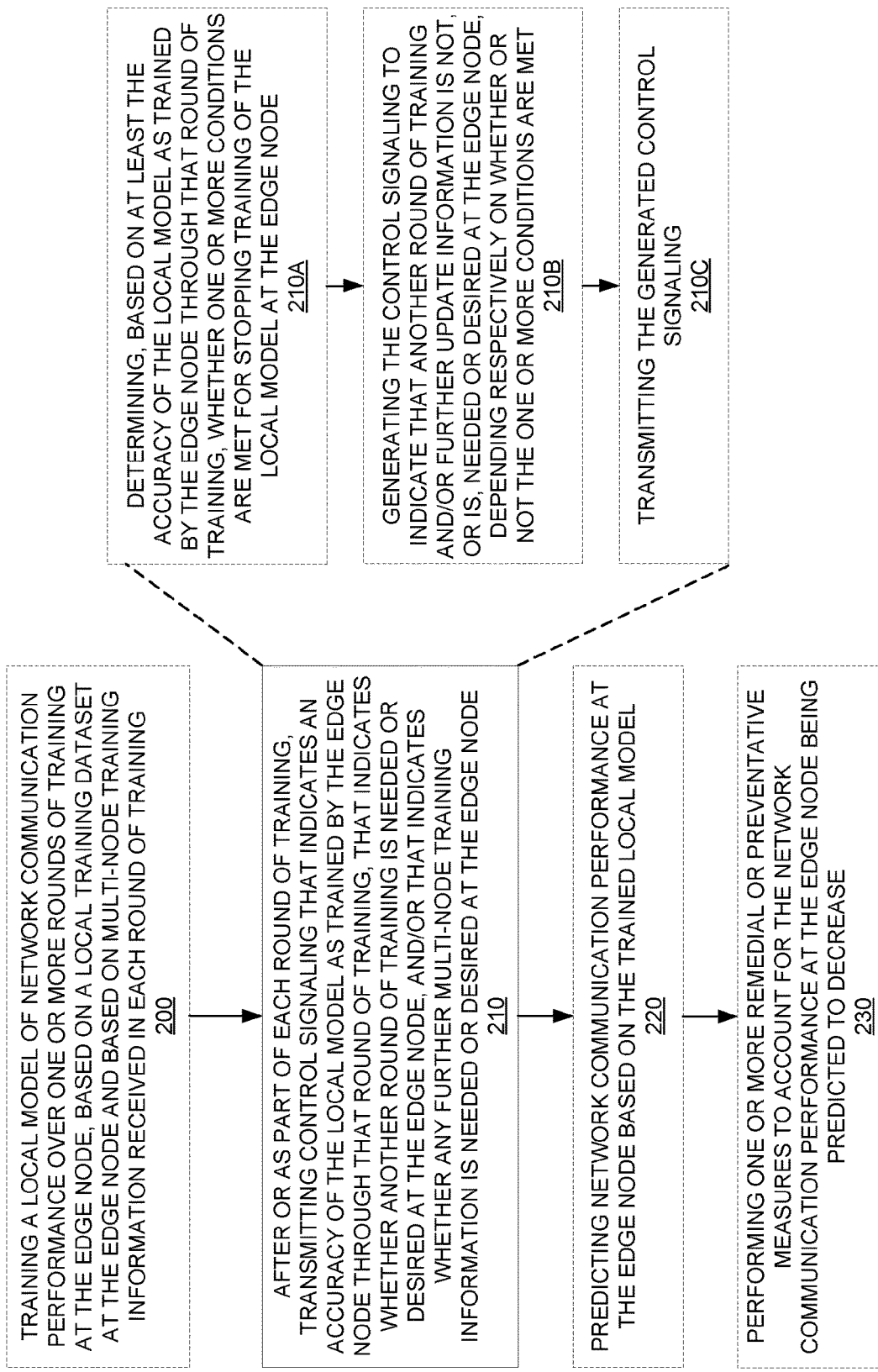
FIG. 2 is a logic flow diagram of a method for using federated learning to predict network communication performance at an edge node in an edge communication network according to some embodiments.

In view of the above modifications and variations, FIG. 2 depicts a method for using federated learning to predict network communication performance at an edge node 10-1 in an edge communication network in accordance with particular embodiments. The method is performed by the edge node 10-1. In some embodiments, the method includes training a local model 14-1 of network communication performance over one or more rounds of training at the edge node 10-1, based on a local training dataset 16-1 at the edge node 10-1 and based on multi-node training information 20-1 received in each round of training (Block 200). In some embodiments, the multi-node training information 20-1 comprises information about local models 14-2 . . . 14-N at other respective edge nodes 10-2 . . . 10-N as trained based on local training datasets 16-2 . . . 16-N at the other edge nodes 10-1 . . . 10-N. Regardless, the method in some embodiments may also include, after or as part of each round of training, transmitting control signaling that indicates an accuracy of the local model 14-1 as trained by the edge node 10-1 through that round of training, that indicates whether another round of training is needed or desired at the edge node 10-1, and/or that indicates whether any further multi-node training information 20-1 is needed or desired at the edge node 10-1 (Block 210). In one or more embodiments, the method may further include predicting network communication performance at the edge node 10-1 based on the trained local model 14-1 (Block 220).

In some embodiments, the method may also include performing one or more remedial or preventative measures to account for the network communication performance at the edge node 10-1 being predicted to decrease (Block 230).

In some embodiments, the control signaling indicates whether another round of training is needed or desired at the edge node 10-1 and/or indicates whether any further update information is needed or desired at the edge node 10-1.

In some embodiments, step 210 may more specifically include, for each of the one or more rounds of training, determining, based on at least the accuracy of the local model 14-1 as trained by the edge node 10-1 through that round of training, whether one or more conditions are met for stopping training of the local model 14-1 at the edge node 10-1 (Block 210A). In some embodiments, for example, the one or more conditions include the accuracy of the local model reaching an accuracy threshold and/or improving by less than a minimum incremental improvement threshold since one or more previous rounds of training. Regardless, the step 210 may further include generating the control signaling to indicate that another round of training and/or further update information is not, or is, needed or desired at the edge node 10-1, depending respectively on whether or not the one or more conditions are met (Block 210B). And further include transmitting the generated control signaling (Block 210C).

In some embodiments, the control signaling indicates that the edge node 10-1 does not need or desire another round of training and/or any further update information and further indicates for how long the edge node 10-1 does not need or desire another round of training and/or any further update information.

In some embodiments, the control signaling indicates an accuracy of the local model as trained by the edge node 10-1 through that round of training. In one such embodiment, the control signaling indicates the accuracy of the local model with respect to a local test dataset at the edge node.

In some embodiments, the control signaling may be transmitted to one or more of the other edge nodes 10-2 . . . 10-N. Alternatively or additionally, the control signaling may be transmitted to a server 12.

In some embodiments, the multi-node training information 20-1 is received from the other edge nodes 10-2 . . . 10-N. Alternatively or additionally, the multi-node training information 20-1 is received from a server 12.

In some embodiments, the multi-node training information 20-1 includes a combination of local updates that the other edge nodes respectively made to local models at the other edge nodes. Alternatively or additionally, the multi-node training information 20-1 includes an average of local updates that the other edge nodes respectively made to local models at the other edge nodes.

In other embodiments, the multi-node training information includes, for each of multiple other edge nodes, a local update that the other edge node made to a local model at the other edge node. In one such embodiment, for instance, for each of the one or more rounds of training, said training further comprises: (i) deciding which one or more of the local updates to combine with one another, and/or with a local update determined by the edge node based on the local training dataset at the edge node, into a combined update, and (ii) updating the local model at the edge node based on the combined update.

In some embodiments, the edge node 10-1 is a base station.

In some embodiments, the local model 14-1 at the edge node 10-1 is a model of a predicted level of degradation in one or more key performance indicators that indicate network communication performance in the edge communication network. For example, the local model 14-1 at the edge node 10-1 may map the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

In some embodiments, the local model at the edge node and the local models at the other edge nodes are each a neural network model. In this case, a local update to a neural network model includes an updated weight matrix.

In some embodiments, the decision comprises deciding to use one or more of the local updates that, when combined with one another and/or with the local update determined by the edge node, maximizes an accuracy of the local model at the edge node with respect to a local test dataset at the edge node. Alternatively or additionally, the decision is based on reinforcement learning at the edge node. For example, this decision may use a reinforcement learning process in which the local test dataset at the edge node is a state, an accuracy metric indicating an accuracy of the local model is a reward, and a time taken to determine the accuracy metric for a possible local update is a cost. Alternatively or additionally, the decision may be based on a genetic algorithm at the edge node, a grid search, and/or a random search at the edge node.

Figure 3:
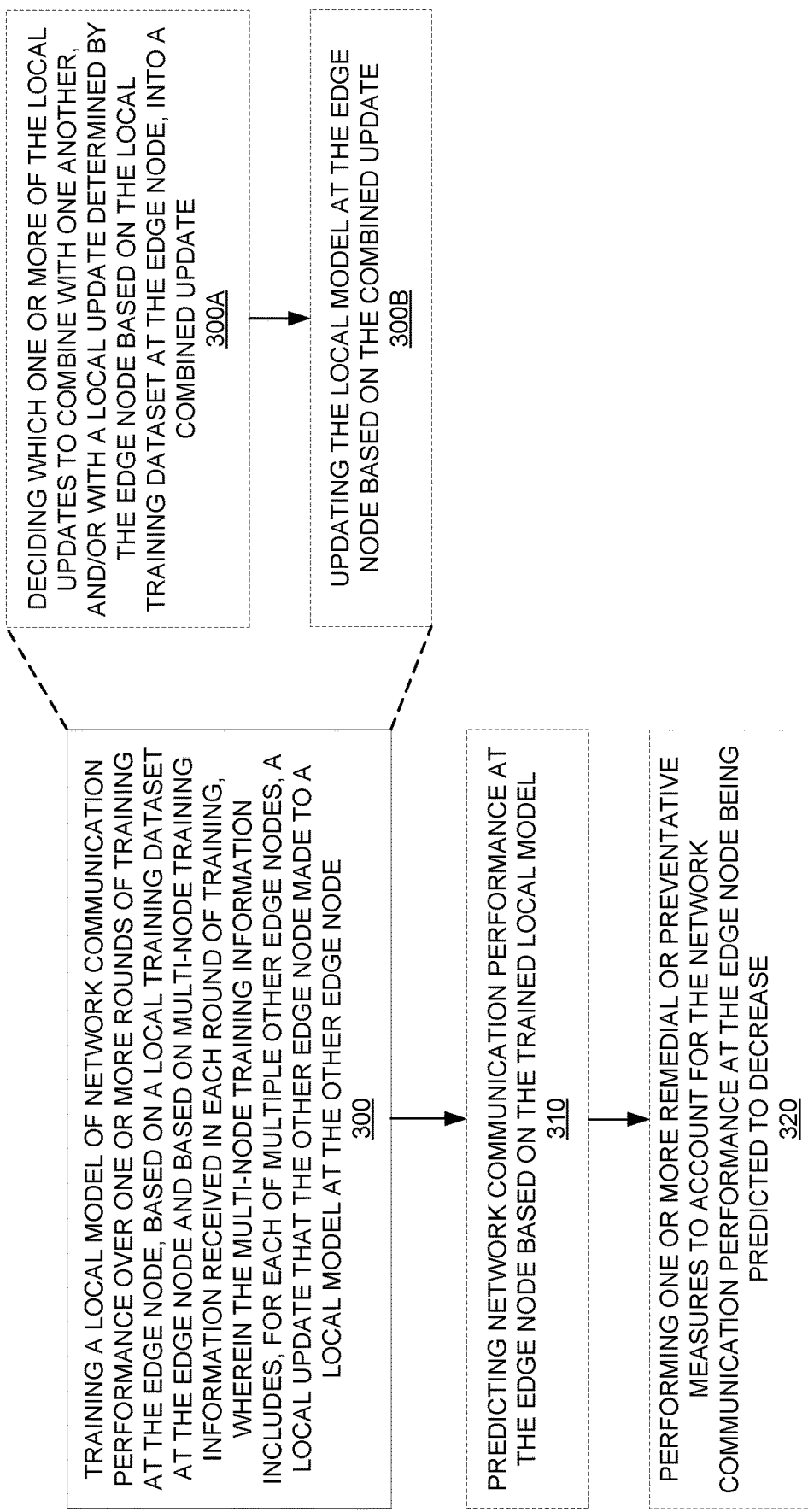
FIG. 3 is a logic flow diagram of a method for using federated learning to predict network communication performance at an edge node in an edge communication network in accordance with other embodiments.

FIG. 3 depicts a method for using federated learning to predict network communication performance at an edge node 10-1 in an edge communication network in accordance with other particular embodiments. The method is performed by an edge node 10-1. In some embodiments, the method includes training a local model 14-1 of network communication performance over one or more rounds of training at the edge node 10-1, based on a local training dataset 16-1 at the edge node 10-1 and based on multi-node training information 20-1 received in each round of training (Block 300). In one or more embodiments the multi-node training information 20-1 includes, for each of multiple other edge nodes 10-2 . . . 10-N, a local update that the other edge node made to a local model at the other edge node.

In some embodiments, for example, this training, for each of the rounds, may include deciding which one or more of the local updates to combine with one another, and/or with a local update determined by the edge node 10-1 based on the local training dataset 16-1 at the edge node 10-1, into a combined update (Block 300A). The training may also include updating the local model 14-1 at the edge node 10-1 based on the combined update (Block 300B).

Regardless, in some embodiments, the method also includes predicting network communication performance at the edge node 10-1 based on the trained local model 14-1 (Block 310). Moreover, in one or more embodiments, the method may include performing one or more remedial or preventative measures to account for the network communication performance at the edge node 10-1 being predicted to decrease (Block 320).

In some embodiments, the decision comprises deciding to use one or more of the local updates that, when combined with one another and/or with the local update determined by the edge node, maximizes an accuracy of the local model at the edge node with respect to a local test dataset at the edge node. Alternatively or additionally, the decision is based on reinforcement learning at the edge node. For example, this decision may use a reinforcement learning process in which the local test dataset at the edge node is a state, an accuracy metric indicating an accuracy of the local model is a reward, and a time taken to determine the accuracy metric for a possible local update is a cost. Alternatively or additionally, the decision may be based on a genetic algorithm at the edge node, a grid search, and/or a random search at the edge node.

In any event, in some embodiments, the method further comprises, for each of the one or more rounds of training: (i) combining into a combined update one or more of the local updates with one another and/or with a local update determined by the edge node based on a local training dataset at the edge node, and (ii) updating the local model at the edge node based on the combined update. For example, such combining may comprise averaging.

In some embodiments, the multi-node training information is received from one or more of the other edge nodes. Alternatively or additionally, the multi-node training information is received from a server.

In some embodiments, the method may further comprise performing one or more remedial or preventative measures to account for the network communication performance at the edge node being predicted to decrease.

In some embodiments, the edge node 10-1 is a base station.

In some embodiments, the local model 14-1 at the edge node 10-1 is a model of a predicted level of degradation in one or more key performance indicators that indicate network communication performance in the edge communication network. For example, the local model 14-1 at the edge node 10-1 may map the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

In some embodiments, the local model at the edge node and the local models at the other edge nodes are each a neural network model. In this case, a local update to a neural network model includes an updated weight matrix.

Figure 4:
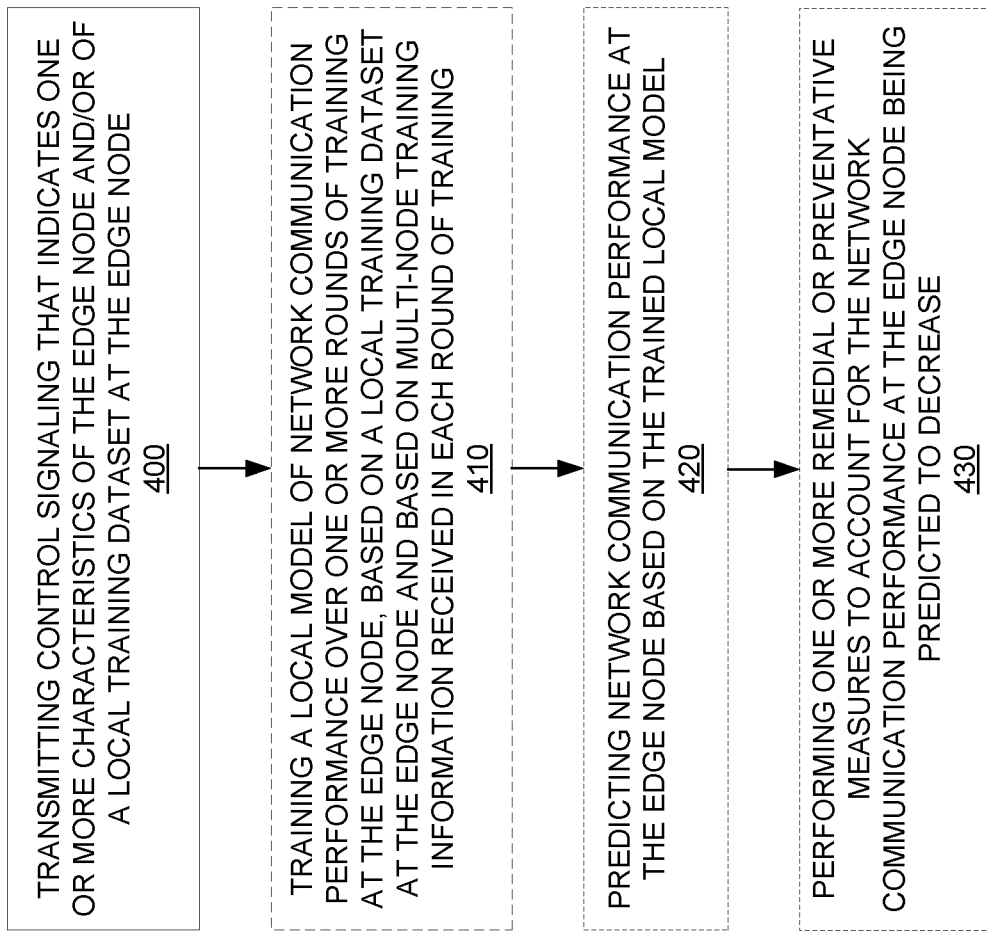
FIG. 4 is a logic flow diagram of a method for using federated learning to predict network communication performance at an edge node in an edge communication network in accordance with yet other embodiments.

FIG. 4 depicts a method for using federated learning to predict network communication performance at an edge node 10-1 in an edge communication network in accordance with still other particular embodiments. The method is performed by an edge node 10-1. In one or more embodiments, the method includes transmitting control signaling that indicates one or more characteristics of the edge node 10-1 and/or of a local training dataset 16-1 at the edge node 10-1 (Block 400).

In some embodiments, for example, the control signaling indicates one or more characteristics of the edge node 10-1. The characteristic(s) may include one or more of: a geographic location of the edge node; a deployment type of the edge node; an overall network quality at the edge node; a configuration of the edge node; or a statistical measure of a number of subscribers served by the edge node.

Alternatively or additionally, the control signaling may indicate one or more characteristics of the local training dataset at the edge node. In this case, the one or more characteristics of the local training dataset at the edge node may for example include one or more of: a statistical distribution of labels assigned to respective instances of the local training dataset; or a statistical distribution of labels assigned to each instance of the local training dataset.

In some embodiments, the control signaling is transmitted to one or more of the other edge nodes. Alternatively or additionally, the control signaling in some embodiments is transmitted to a server.

Regardless, in some embodiments, the method also includes training a local model 14-1 of network communication performance over one or more rounds of training at the edge node 10-1, based on a local training dataset 16-1 at the edge node 10-1 and based on multi-node training information 20-1 received in each round of training (Block 410). Such multi-node training information 20-1 may for example be received from one or more of the other edge nodes 10-2 . . . 10-N and/or from a server 12. Regardless, in some embodiments, the multi-node training information 20-1 comprises information about local models 14-2 . . . 14-N at other respective edge nodes 10-2 . . . 10-N as trained based on local training datasets 16-2 . . . 16-N at the other edge nodes 10-2 . . . 10-N. In one embodiment, the multi-node training information 20-1 includes the local updates respectively determined by the other edge nodes 10-2 . . . 10-N.

Regardless, the method in some embodiments also includes predicting network communication performance at the edge node 10-1 based on the trained local model 14-1 (Block 420). Moreover, in one or more embodiments, the method may include performing one or more remedial or preventative measures to account for the network communication performance at the edge node 10-1 being predicted to decrease (Block 430).

In some embodiments, for each of the one or more rounds of training, training further comprises: deciding which one or more of the local updates to combine with one another, and/or with a local update determined by the edge node based on the local training dataset at the edge node, into a combined update, and updating the local model at the edge node based on the combined update.

In some embodiments, the edge node 10-1 is a base station.

In some embodiments, the local model 14-1 at the edge node 10-1 is a model of a predicted level of degradation in one or more key performance indicators that indicate network communication performance in the edge communication network. For example, the local model 14-1 at the edge node 10-1 may map the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

In some embodiments, the local model at the edge node and the local models at the other edge nodes are each a neural network model. In this case, a local update to a neural network model includes an updated weight matrix.

Figure 5:
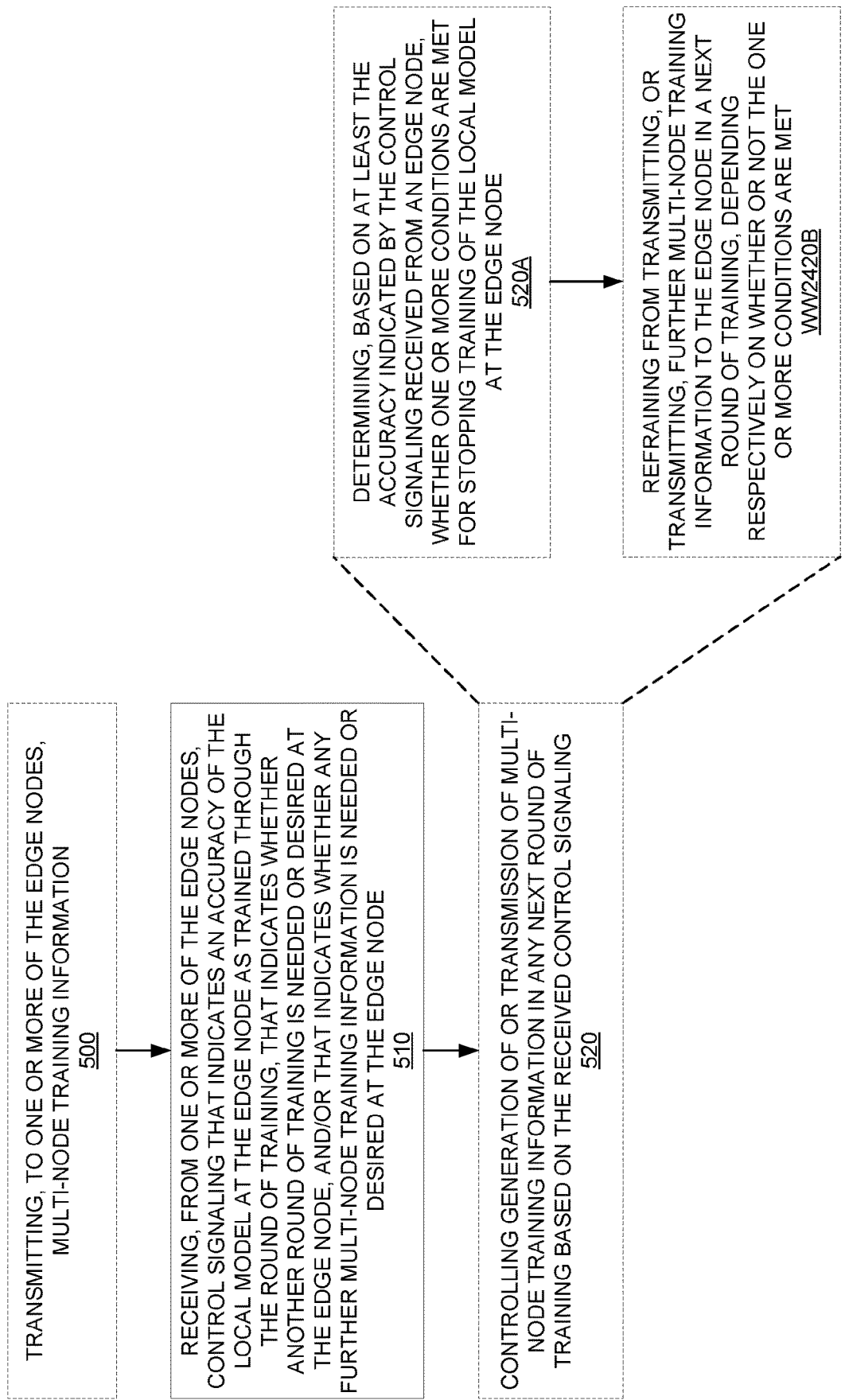
FIG. 5 is a logic flow diagram of a method performed by a server for coordinating training of local models of network communication performance at respective edge nodes according to some embodiments.

FIG. 5 depicts a method performed by a server 12 for coordinating training of local models 14-1 . . . 14-N of network communication performance at respective edge nodes 10-1 . . . 10-N. The method as shown may comprise the following for each of one or more rounds of training. In particular, the method may comprise transmitting, to one or more of the edge nodes 10-1 . . . 10-N, multi-node training information 20-1 . . . 20N, e.g., that comprises information about local models 14-1 . . . 14-N at respective edge nodes 10-1 . . . 10-N as trained based on local training datasets 16-1 . . . 160N at the edge nodes 10-1 . . . 10-N (Block 500). The method may also comprise receiving, from one or more of the edge nodes 10-1 . . . 10-N, control signaling that indicates an accuracy of the local model at the edge node as trained through the round of training, that indicates whether another round of training is needed or desired at the edge node, and/or that indicates whether any further multi-node training information is needed or desired at the edge node (Block 510). The method in some embodiments may further include controlling generation of or transmission of multi-node training information 20-1 . . . 20-N in any next round of training based on the received control signaling (Block 520).

In some embodiments, the control signaling indicates the accuracy of the local model at the edge node as trained through the round of training. In some of these embodiments, controlling in Block 520 includes determining, based on at least the accuracy indicated by the control signaling received from an edge node, whether one or more conditions are met for stopping training of the local model at the edge node (Block 520A). In this case, the controlling may involve refraining from transmitting, or transmitting, further multi-node training information to the edge node in a next round of training, depending respectively on whether or not the one or more conditions are met (Block 520B). In one such embodiment, the one or more conditions include the accuracy of the local model reaching an accuracy threshold and/or improving by less than a minimum incremental improvement threshold since one or more previous rounds of training.

In some embodiments, the control signaling indicates whether another round of training is needed or desired at the edge node and/or indicates whether any further update information is needed or desired at the edge node. Alternatively or additionally, the control signaling indicates that the edge node does not need or desire another round of training and/or any further update information and further indicates for how long the edge node does not need or desire another round of training and/or any further update information.

In some embodiments, controlling in step 520 comprises transmitting or not transmitting multi-node training information to an edge node in a next round of training, depending respectively on whether or not the control signaling from the edge node indicates that the edge node needs or desires the further multi-node training information or another round of training.

In some embodiments, the multi-node training information includes a combination of local updates that the respective edge nodes respectively made to local models at the edge nodes. Alternatively or additionally, the multi-node training information includes an average of local updates that the respective edge nodes respectively made to local models at the edge nodes. In other embodiments, the multi-node training information includes, for each of the edge nodes, a local update that the edge node made to a local model at the edge node.

In some embodiments, the edge nodes are base stations.

In some embodiments, the local model at each edge node is a model of a predicted level of degradation in one or more key performance indicators that indicate network communication performance in the edge communication network at the edge node. For example, the local model at each edge node may map the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

In some embodiments, the local model at each edge node is a neural network model. In this case, a local update to a neural network model includes an updated weight matrix.

Figure 6:
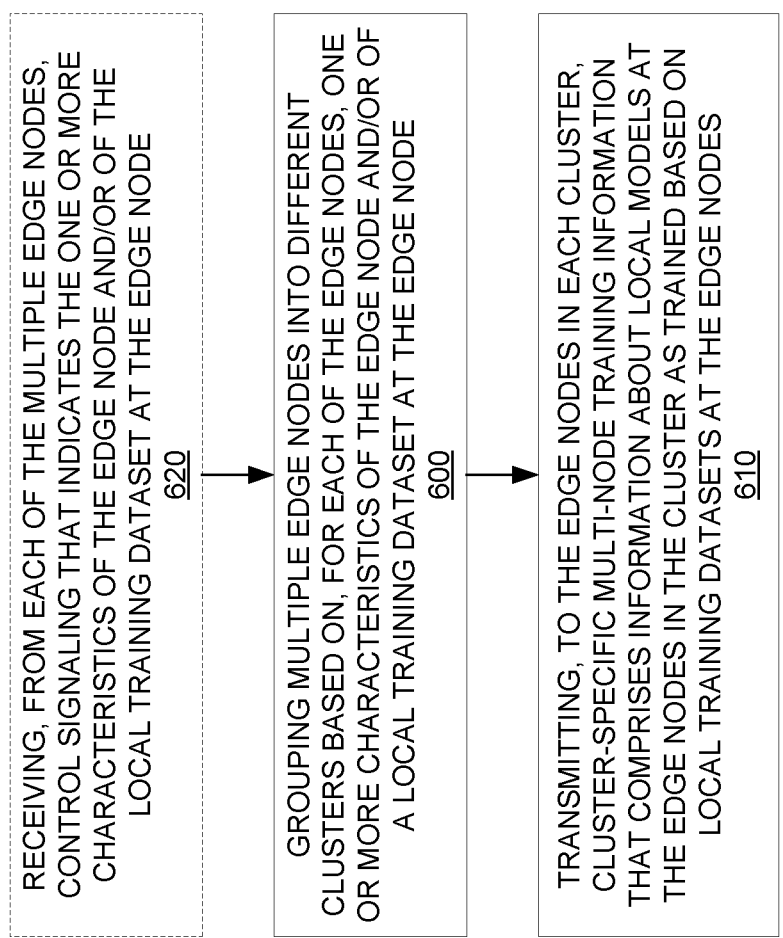
FIG. 6 is a logic flow diagram of a method performed by a server for coordinating training of local models of network communication performance at respective edge nodes according to some embodiments.

FIG. 6 depicts a method performed by a server 12 for coordinating training of local models 14-1 . . . 14-N of network communication performance at respective edge nodes 10-1 . . . 10-N. The method as shown may comprise grouping multiple edge nodes into different clusters based on, for each of the edge nodes 10-1 . . . 10-N, one or more characteristics of the edge node and/or of a local training dataset at the edge node (Block 600). The method may also comprise transmitting, to the edge nodes in each cluster, cluster-specific multi-node training information that comprises information about local models at the edge nodes in the cluster as trained based on local training datasets at the edge nodes (Block 610).

In some embodiments, the method further comprises receiving, from each of the multiple edge nodes, control signaling that indicates the one or more characteristics of the edge node and/or of the local training dataset at the edge node (Block 620).

In some embodiments, the grouping is based on the one or more characteristics of the edge nodes.

In some embodiments, the one or more characteristics of an edge node include one or more of: a geographic location of the edge node; a deployment type of the edge node; an overall network quality at the edge node; a configuration of the edge node; or a statistical measure of a number of subscribers served by the edge node.

In some embodiments, the grouping is based on the one or more characteristics of the local training datasets at the edge nodes.

In some embodiments, the one or more characteristics of the local training dataset at an edge node include one or more of: a statistical distribution of labels assigned to respective instances of the local training dataset; or a statistical distribution of labels assigned to each instance of the local training dataset.

In some embodiments, said grouping comprises grouping into the same cluster edge nodes whose one or more characteristics indicated by the received control signaling are most similar. For example, in some embodiments, similarity between the one or more characteristics for different edge nodes is defined according to a distance metric, e.g., a Eucleadean metric or a Manhattan metric.

In some embodiments, the edge nodes are base stations.

In some embodiments, the local model at each edge node is a model of a predicted level of degradation in one or more key performance indicators that indicate network communication performance in the edge communication network at the edge node. For example, the local model at each edge node may map the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

In some embodiments, the local model at each edge node is a neural network model. In this case, a local update to a neural network model includes an updated weight matrix.

In some embodiments, the cluster-specific multi-node training information transmitted to a cluster includes a combination of local updates that the respective edge nodes in the cluster respectively made to local models at the edge nodes.

In some embodiments, the multi-node training information transmitted to a cluster includes an average of local updates that the respective edge nodes in the cluster respectively made to local models at the edge nodes. In other embodiments, the multi-node training information transmitted to a cluster includes, for each of the edge nodes in the cluster, a local update that the edge node made to a local model at the edge node.

Figure 7:
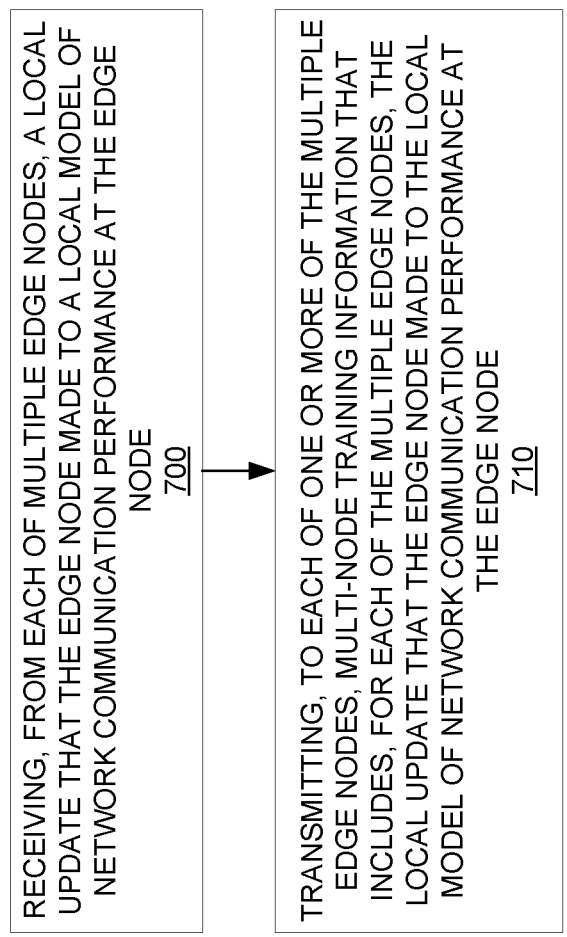
FIG. 7 is a logic flow diagram of a method performed by a server for coordinating training of local models of network communication performance at respective edge nodes according to other embodiments.

FIG. 7 depicts a method performed by a server 12 for coordinating training of local models 14-1 . . . 14-N of network communication performance at respective edge nodes 10-1 . . . 10-N. The method as shown may comprise the following for each of one or more rounds of training. In particular, the method may comprise receiving, from each of multiple edge nodes, a local update that the edge node made to a local model of network communication performance at the edge node (Block 700). The method may also comprise transmitting, to each of one or more of the multiple edge nodes, multi-node training information that includes, for each of the multiple edge nodes, the local update that the edge node made to the local model of network communication performance at the edge node (Block 710).

In some embodiments, the edge nodes are base stations.

In some embodiments, the local model at each edge node is a model of a predicted level of degradation in one or more key performance indicators that indicate network communication performance in the edge communication network at the edge node. For example, the local model at each edge node may map the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

In some embodiments, the local model at each edge node is a neural network model. In this case, a local update to a neural network model includes an updated weight matrix.

In some embodiments, the method further comprises grouping the multiple edge nodes into different clusters based on one or more characteristics of the edge nodes and/or of local training datasets at the edge nodes. In this case, said transmitting comprises transmitting, to the edge nodes in each cluster, cluster-specific multi-node training information that includes local updates received from the edge nodes in that cluster. Regardless, in some embodiments, the grouping is based on the one or more characteristics of the edge nodes. In some embodiments, the one or more characteristics of an edge node include one or more of: a geographic location of the edge node; a deployment type of the edge node; an overall network quality at the edge node; a configuration of the edge node; or a statistical measure of a number of subscribers served by the edge node.

Alternatively or additionally, the grouping is based on the one or more characteristics of the local training datasets at the edge nodes.

In some embodiments, the one or more characteristics of the local training dataset at an edge node include one or more of: a statistical distribution of labels assigned to respective instances of the local training dataset; or a statistical distribution of labels assigned to each instance of the local training dataset.

In some embodiments, the method further comprises receiving, from each of the multiple edge nodes, control signaling that indicates the one or more characteristics of the edge node and/or of the local training dataset at the edge node.

In some embodiments, said grouping comprises grouping into the same cluster edge nodes whose one or more characteristics indicated by the received control signaling are most similar. For example, in some embodiments, similarity between the one or more characteristics for different edge nodes is defined according to a distance metric, e.g., a Eucleadean metric or a Manhattan metric.

Embodiments herein also include an edge node (e.g., edge node 10-1) in an edge communication network configured to use federated learning to predict network communication performance at the edge node. The edge node may be configured to perform the method shown in any of FIGS. 2-4.

Embodiments herein further include an edge node (e.g., edge node 10-1) in an edge communication network configured to use federated learning to predict network communication performance at the edge node. The edge node comprises communication circuitry and processing circuitry configured to perform the method shown in any of FIGS. 2-4.

Embodiments herein further include an edge node (e.g., edge node 10-1) in an edge communication network configured to use federated learning to predict network communication performance at the edge node. The edge node comprises one or more processors and a memory, the memory containing instructions executable by the one or more processors whereby the edge node is configured to perform the method shown in any of FIGS. 2-4.

Embodiments moreover include a computer program comprising instructions which, when executed by at least one processor of an edge node (e.g., edge node 10-1) in an edge communication network, causes the edge node to carry out the method shown in any of FIGS. 2-4. Embodiments further include a carrier containing the computer program, wherein the carrier is one of an electronic signal, optical signal, radio signal, or computer readable storage medium.

Embodiments herein also include a server 12 for coordinating federated learning to predict network communication performance in an edge communication network, the server configured to perform the method shown in any of FIGS. 5-7.

Embodiments further include a server 12 for coordinating federated learning to predict network communication performance in an edge communication network, the server comprising: communication circuitry; and processing circuitry configured to perform the method shown in any of FIGS. 5-7.

Embodiments also include a server 12 for coordinating federated learning to predict network communication performance in an edge communication network, the server comprising one or more processors and a memory, the memory containing instructions executable by the one or more processors whereby the server is configured to perform the method shown in any of FIGS. 5-7.

Embodiments moreover include a computer program comprising instructions which, when executed by at least one processor of a server 12 in an edge communication network, causes the server to carry out the method shown in any of FIGS. 5-7. Embodiments further include a carrier containing the computer program, wherein the carrier is one of an electronic signal, optical signal, radio signal, or computer readable storage medium.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
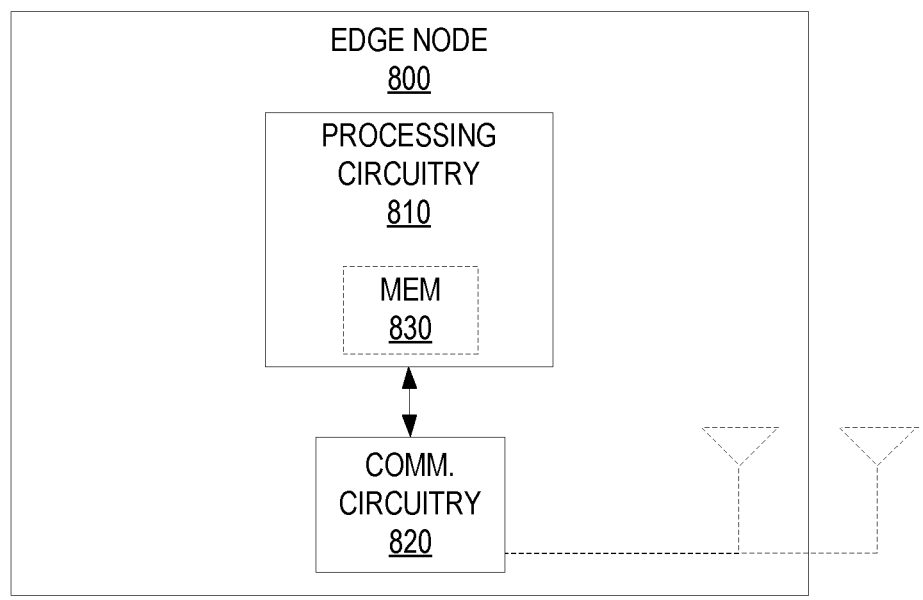
FIG. 8 is a block diagram of an edge node according to some embodiments.

FIG. 8 for example illustrates an edge node 800 (e.g., edge node 10-1) as implemented in accordance with one or more embodiments. As shown, the edge node 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the edge node 800. The processing circuitry 810 is configured to perform processing described above, e.g., in FIGS. 2-4, such as by executing instructions stored in memory 830. The processing circuitry 810 in this regard may implement certain functional means, units, or modules.

Figure 9:
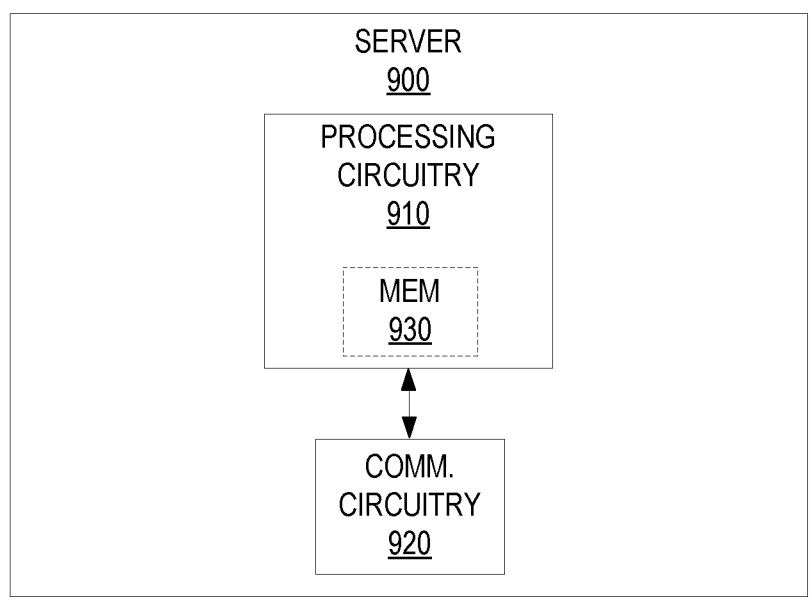
FIG. 9 is a block diagram of a server according to some embodiments.

FIG. 9 illustrates a server 900 (e.g., server 12) as implemented in accordance with one or more embodiments. As shown, the server 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIGS. 5-6, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In some embodiments, the terms site, client, and edge node are used interchangeably herein. Moreover, the terms central node and server may be used interchangeably herein for referring to similar embodiments.

Figure 10:
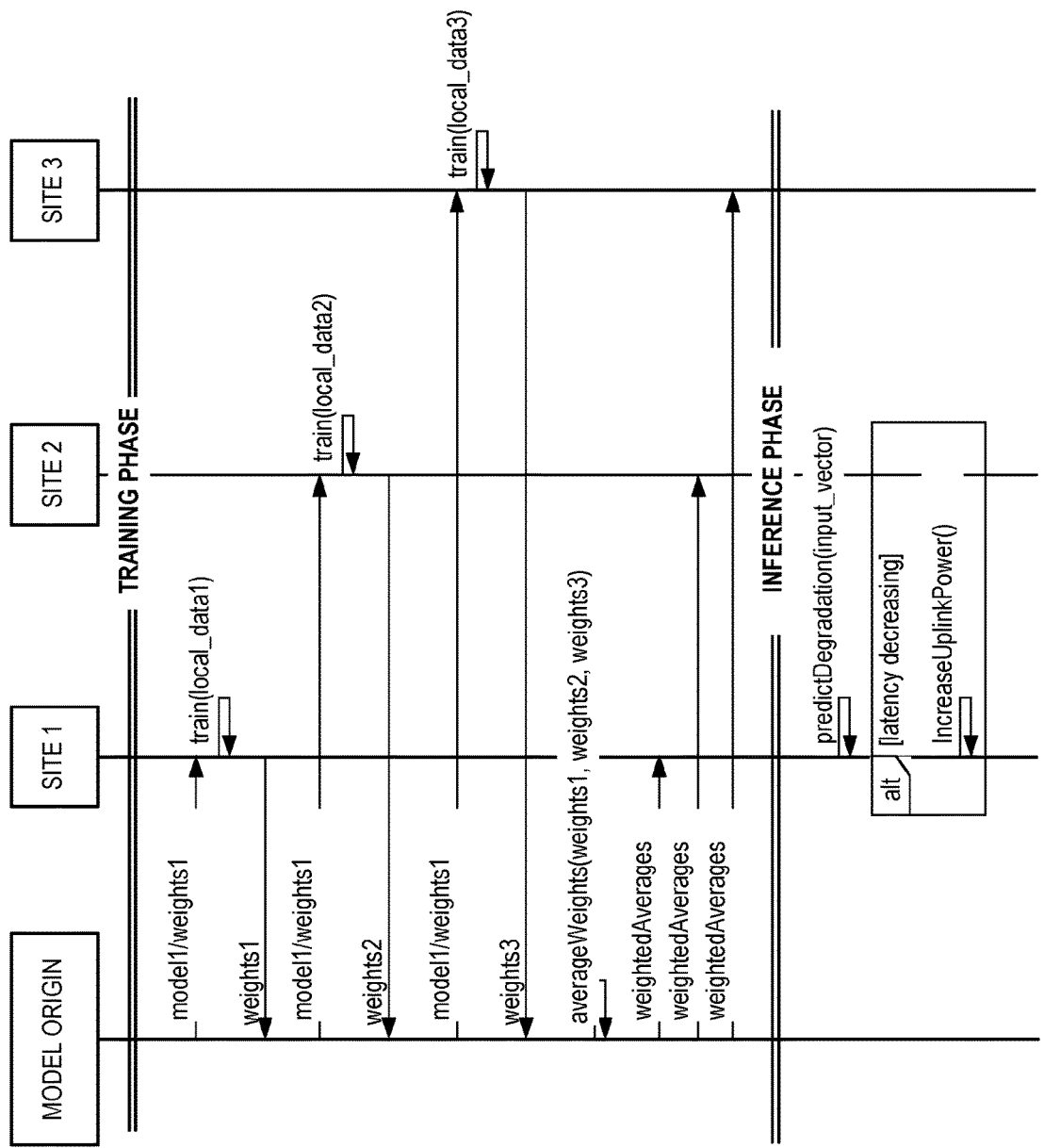
FIG. 10 is a call flow diagram illustrating traditional federated learning.

FIG. 10 describes how traditional federated learning works.

Consider an example use case for site-based Federated Learning. The data for this use case includes 22113 samples with 2540 input KPI features. As an example, below are some of the descriptions of these features (CounterID/Description)→

1526727913→Processing delay of downlink packet data convergence protocol (PDCP) service data units (SDUs) for data radio bearer (DRB) services with the quality of service (QoS) class identifier (QCI) of 3 in a cell 1526727318→Number of normal extended radio access bearers (E-RAB) releases for outgoing handovers of services with the QCI of 2

1526726772→Number of DRBs for the service with QCI of 6 in a cell

1526727420→Number of times modulation and coding scheme (MCS) index 8 is scheduled on the physical uplink shared channel (PUSCH)

1526726827→Downlink traffic volume for PDCP SDUs of services with the QCI of 9 in a cell 1526726688→Number of abnormal E-RAB releases for services with the QCI of 2 in a cell The target variable consists of a variable of 3 class, [0, 1, 2] since it is a classification problem. Each class represents the level of the KPI degradation within the next 24 hours.

Figure 11:
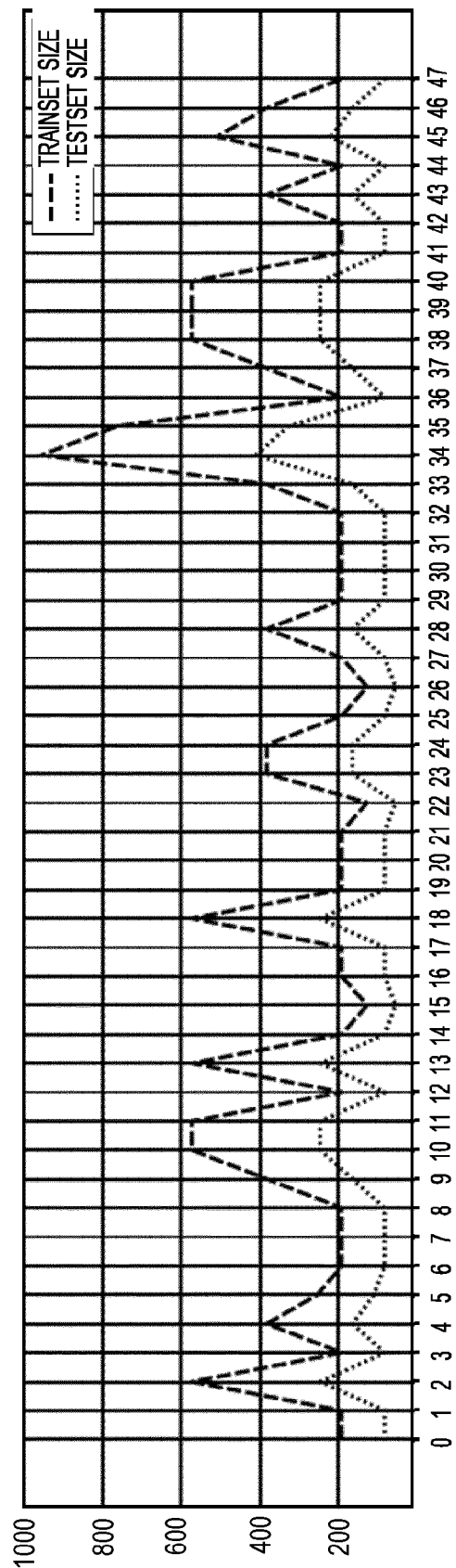
FIG. 11 is a line graph showing the train and test set size of 48 clients.

Each island is split into randomly 70% train, 30% test to run 10 folds CV (cross validation). FIG. 11 shows the train and test set size of 48 clients.

Machine learning model: The same supervised machine learning classification model is used in all experiments. The model consists of a neural network with 1 hidden layer (512 neurons, activation ReLu, BatchNormalization). The final layer consists of 3 layers (3 classes) with Softmax activation function Methodology: Federated Learning on the KPI degradation use case via deterministically separated clients. In this scenario, clients are separated where each client's data is completely isolated from each other. This way, no data is allowed to leave from any site.

Experiment procedure: 3 experiments are run first to draw baselines, and then observe how the model benefits from federated learning.

Experiment 1 (Centralized learning): The model is trained in a traditional and centralized manner, where all data is collected. In this baseline experiment, all training data from all nodes are collected to a central node where the machine learning model is trained. Then, the train model is used to inference the KPI degradation on individual nodes separately. This model is trained via 130 epochs with a batch size of 64.

Experiment 2 (Decentralized learning): In contrast to the centralized learning, the sites train on their own datasets, without sharing any data within each other. They also execute the inference on their own dataset only. The models are trained via 130 epochs with batch size of 64.

Experiment 3 (Federated Learning): The sites do not share any data but only shares weights. The individual site models are trained via 10 epochs with batch size of 64, through maximum 13 rounds. The difference as compared to the previous embodiment is that in this one, the sites (clients) do not download an initial model from the central node, and instead each client trains on individual datasets, and shares the weights only after the first round.

Federated learning-based training procedure and algorithm: All nodes train from scratch (10 epochs, max:6 rounds, batch size 64). Note that some sites have only a very few rounds due to the rather low amount of data. Weights are sent to the central node. Training on the nodes continues until all batches on a node is trained. However, the averaged weights on the nodes continue to update until the total number of rounds is reached. This way, the site continues to learn from others until all rounds are complete.

Algorithm
new_weights=random weights
for every fold of 10 folds:
   initialize client list
   initialize client dictionary
   set max_batch_count to the datasize of the client that has the largest data divided by the batch size. This allows the training to complete until the last batch from all clients.
   initialize round id to 0.
   get random client_train_X, client_train_y, client_test_X, client_test_y while round id is less than max_batch_count:
     for each client:
       get client's train input, X, from client_train_X dictionary
       get client's train label, Y, from client_train_y dictionary
       get client's test input, X', from client_test_X dictionary get client's test label, Y', from client testy dictionary
if it is the first round, i.e., round_id is 0:
create the model for the client$_i$
get the n_batches$_i$ for client i via len(data_client_i)/batch_size else:
set the weights of the model to the new_weights
if round id of client i is less than n_batches$_i$
train the model of client i with the new batch
evaluate the latest client models on the client's testset.
update the new_weights of the client model and update the model weight pool
average the client model weights in the pool
set the new_weights to the average weights
set the max_batch_count to the maximum of the client batch counts.
increment round_id by 1

Figure 12:
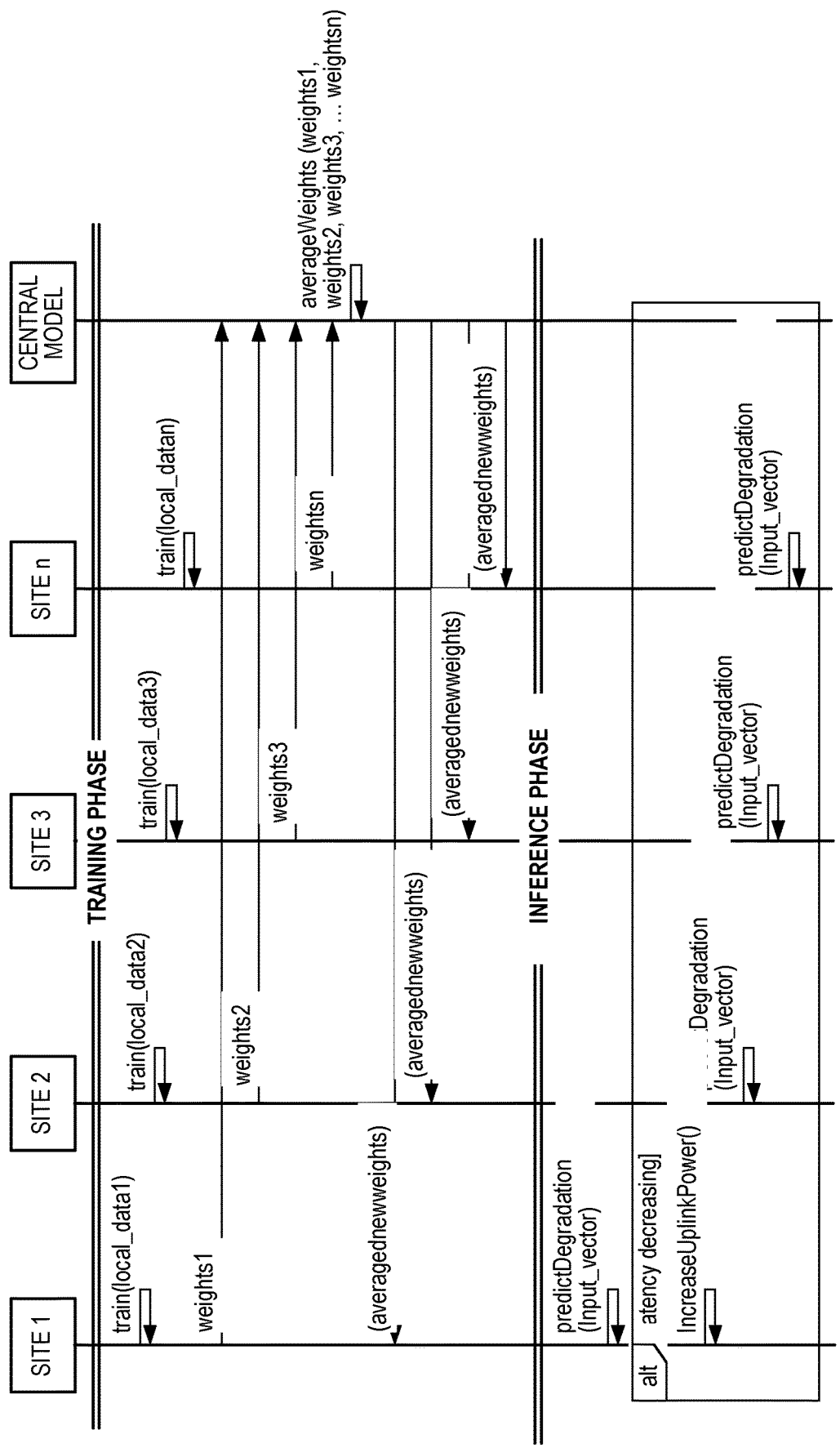
FIG. 12 is a call flow diagram illustrating how the training in experiments is done according to some embodiments.

FIG. 12 is a block diagram showing how the training in the experiments is done.

Figure 13:
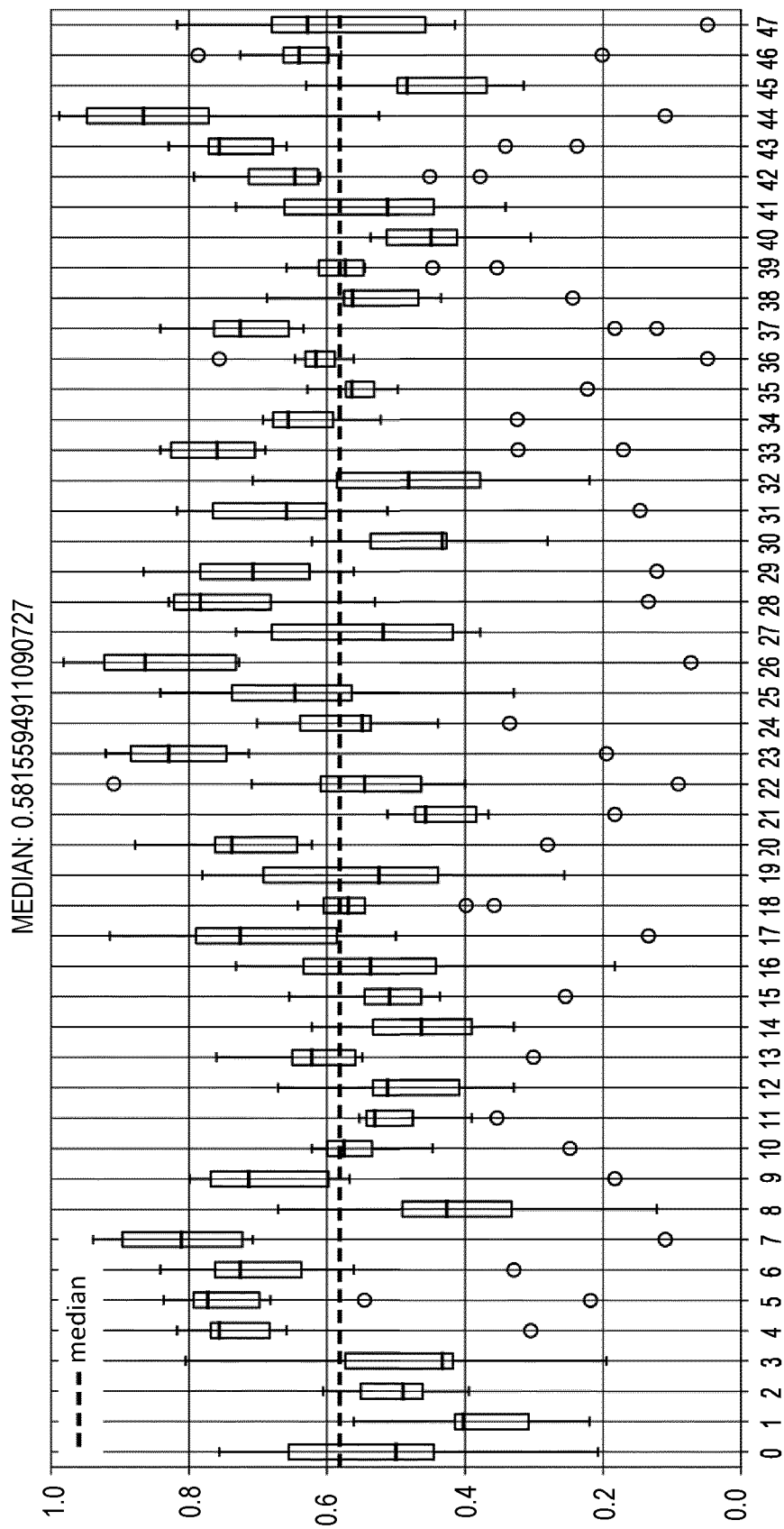
FIG. 13 is a plot showing the results from an experiment using centralized training.

FIG. 13 shows the results from experiment 1 (centralized training). That is, FIG. 13 shows the performance of the models presented when the model is trained on all training sets from all nodes, in a centralized manner and then is applied (inferenced) on the individual site data.

Figure 14:
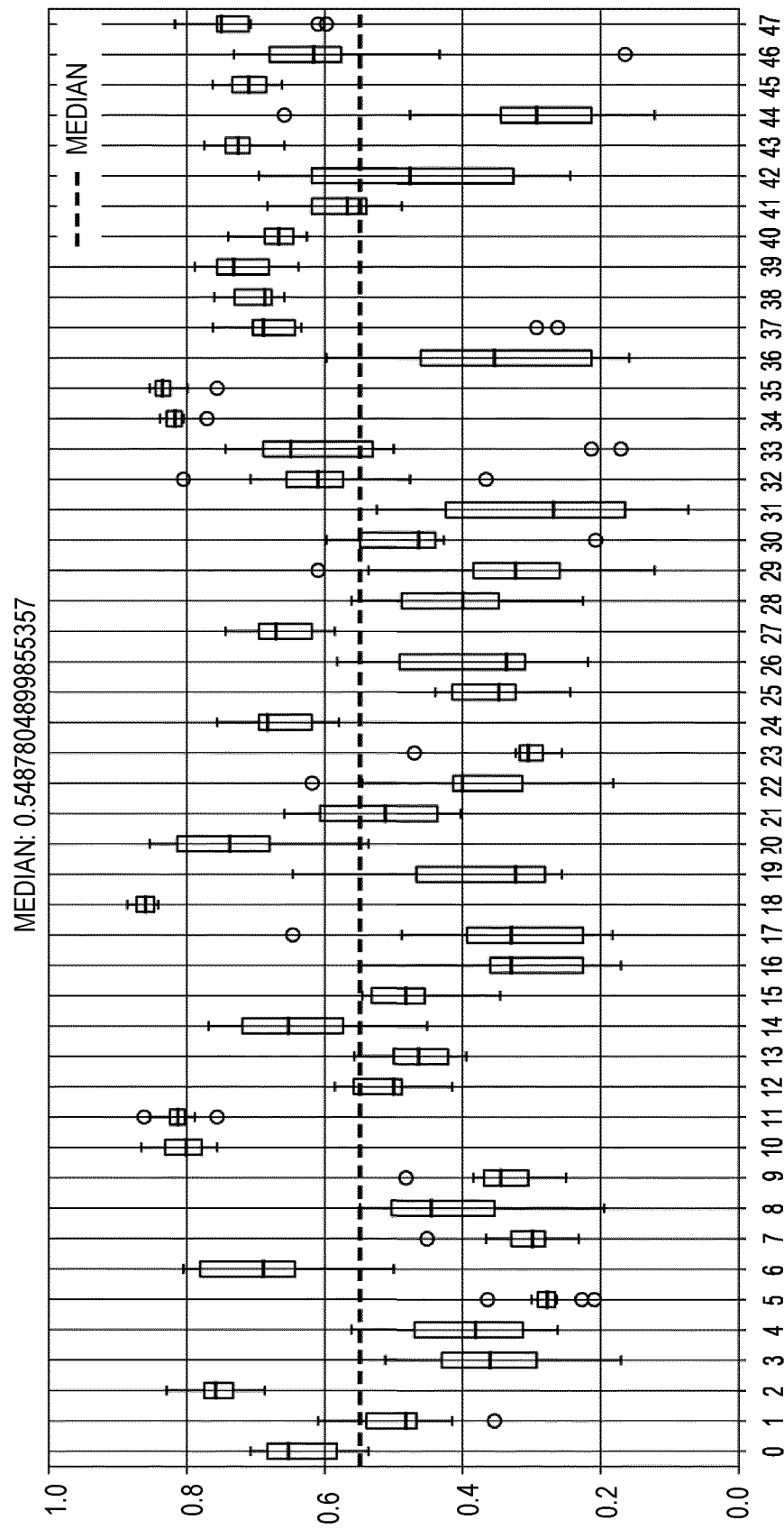
FIG. 14 is a plot showing the results from an experiment using centralized and isolated training.

FIG. 14 shows the results from experiment 2 (decentralized and isolated training). That is, FIG. 14 shows the performance of the models presented when each ML model is trained in an isolated manner (seeing only its own dataset) and then is applied on each nodes individual test sets.

Figure 15:
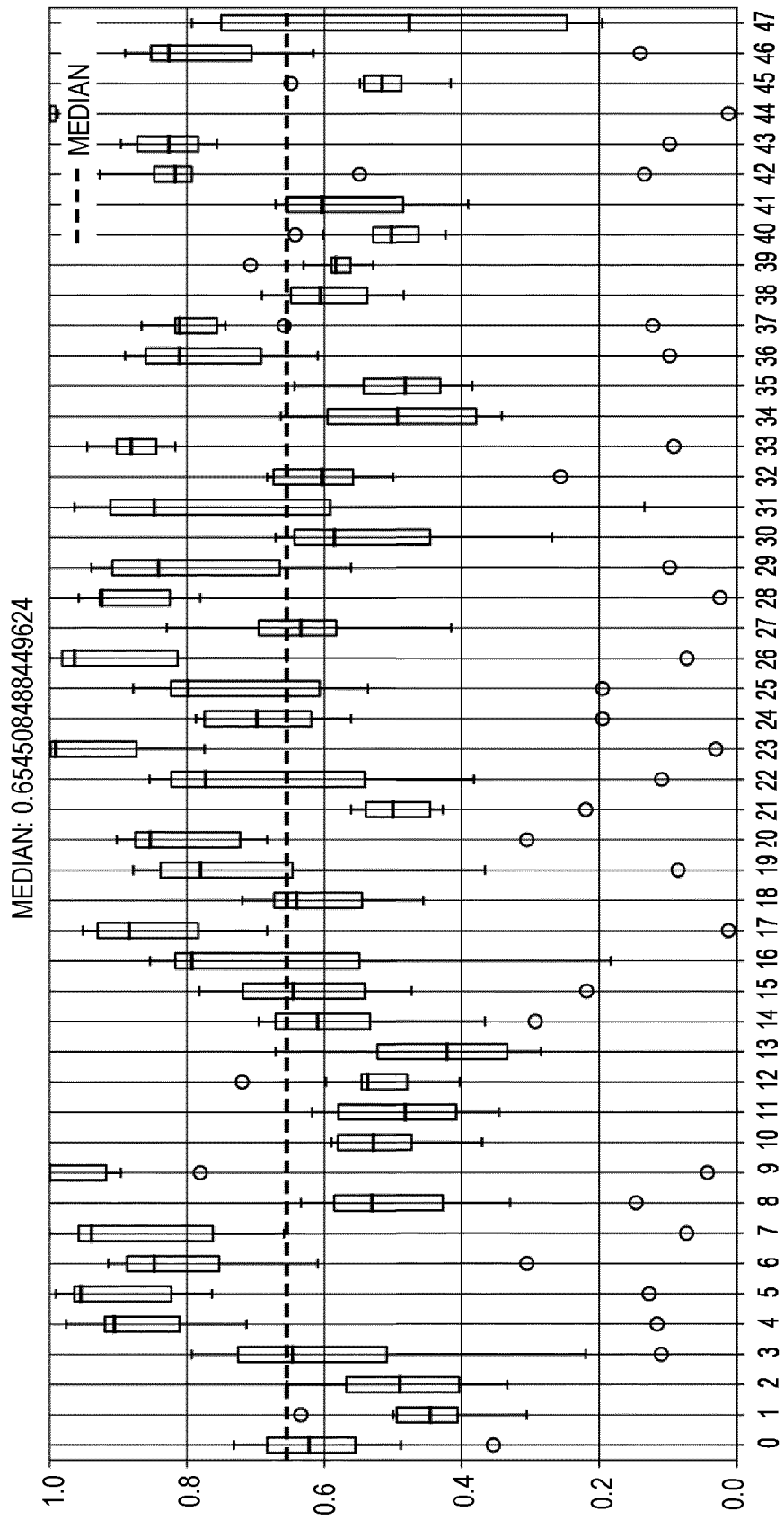
FIG. 15 is a plot showing the results from an experiment federated learning based on training according to some embodiments.

FIG. 15 shows the results from experiment 3 (federated learning based training). That is, FIG. 15 shows the performance of the models presented when each ML model is trained in a federated manner, where each node sends their weights to the centralized after each round (where each round is 10 epochs of training).

The federated learning is trained via 10 epochs, and the maximum number of batches was 13. In order to reduce the training time, since the accuracy on all sites converge after 6 rounds, 6 rounds were run on all FL experiments.

Observe that the FL performs well in comparison to the centralized model as given in FIGS. 13-15. One reason for this is that the site continues to customize the model on towards its own dataset after receiving the updated averaged weights from the central node.

Figure 16:
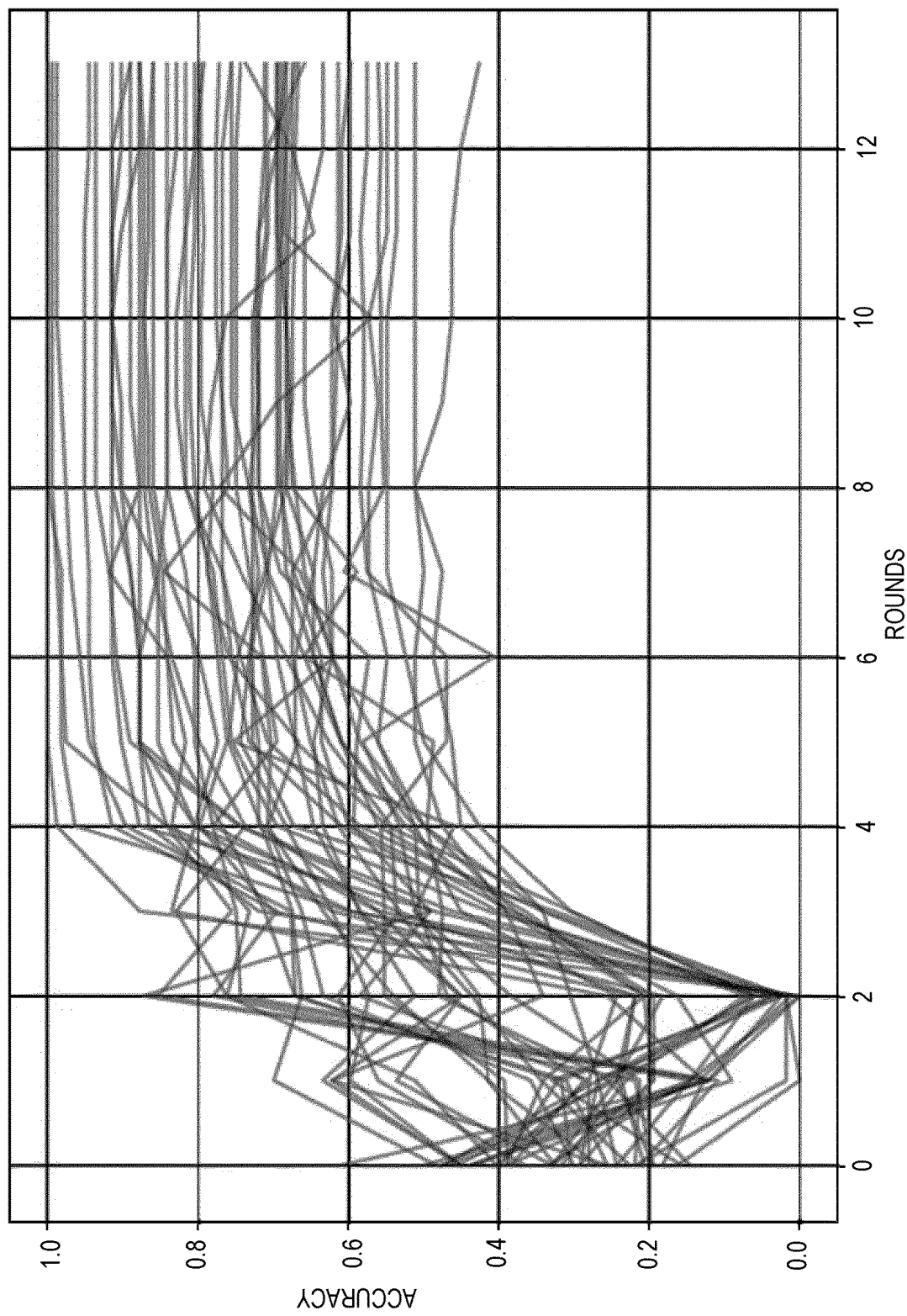
FIG. 16 is a plot showing learning curves of sites according to an example herein.

The learning curves of all 48 sites are given in FIG. 16. This helps to understand when to stop updating weights which would reduce the necessity of redundant round trips for the aim to minimize the signaling volume in between the nodes. According to FIG. 16, after 6 rounds, the prediction performance of the sites converges to their maximum, indicating that training and sharing after 5 or 6 rounds do not help much any further.

Figure 17:
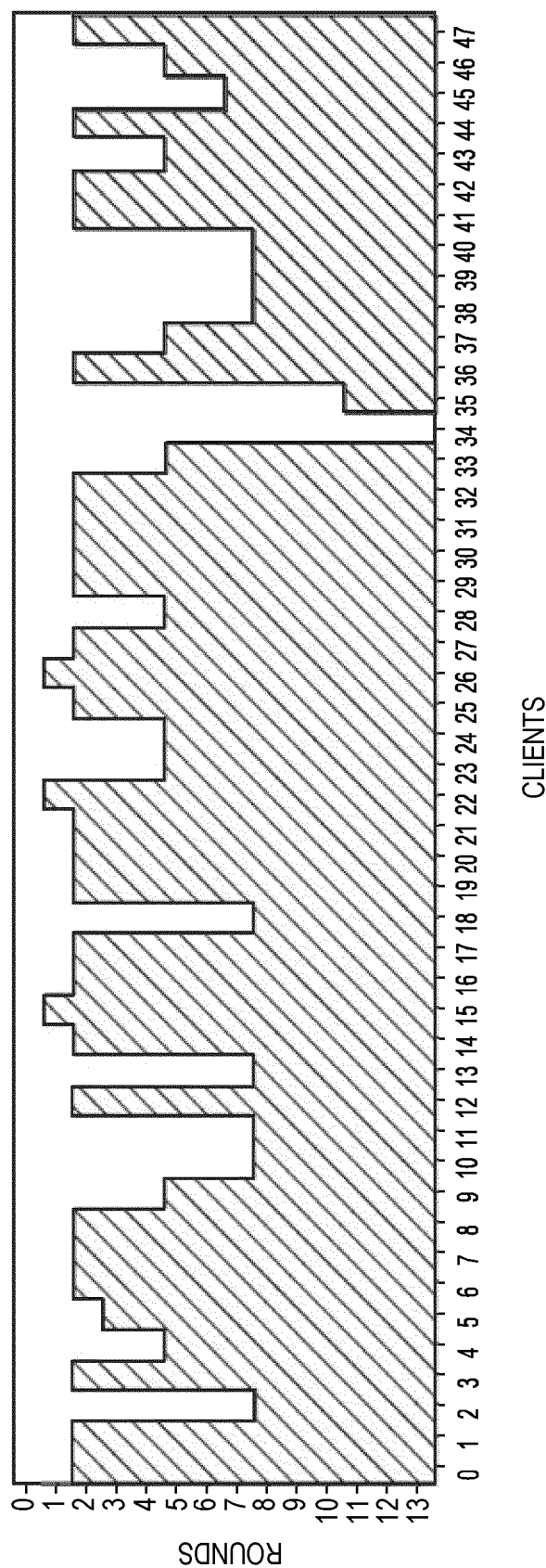
FIG. 17 is a graph showing rounds needed to complete training at various sites according to an example herein.

One reason for this is that the training is complete in most of the sites after 6 batches; in some clients this is earlier and in some clients the training is completed later in time (only after 13 round trips) as given in FIG. 17.

Based on the results achieved, there is an indication that, given the dataset used in the experiments, there are some sites that do not benefit from being trained via a centralized manner. Some example sites that do not benefit from training involving sites (clients): 0, 1, 2, 10, 11, 18, 34, and 35, which indicates that their data characteristics, which can be very well be depending on their geographical location or other dependencies such as site configuration or average number of subscribers being served, are different. However, in overall it is observed most of the sites benefit from being federated as also concluded from FIG. 15.

Figure 18A:
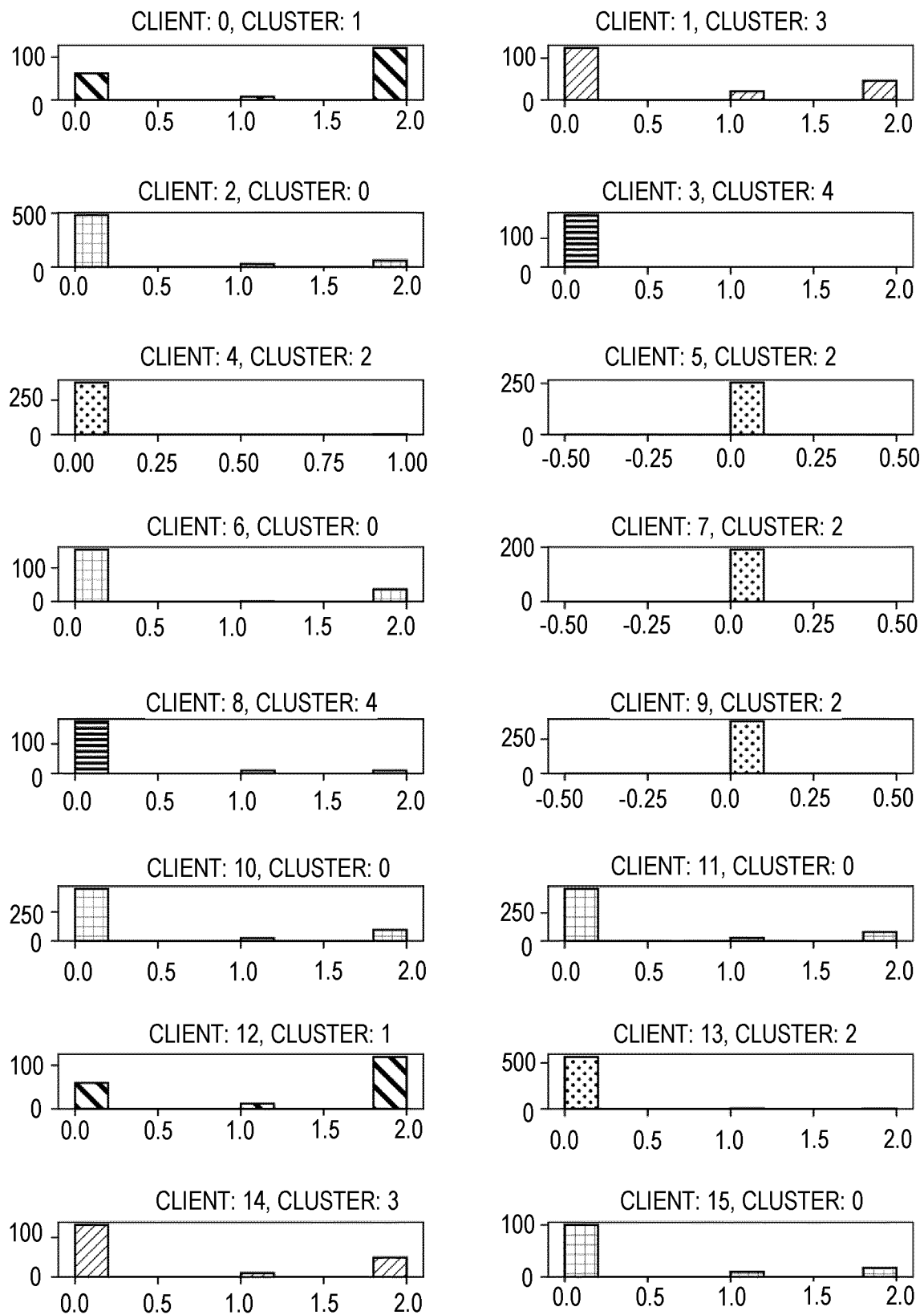
FIG. 18A-18B are block diagrams showing clustering of sites according to some embodiments.
Figure 18B:
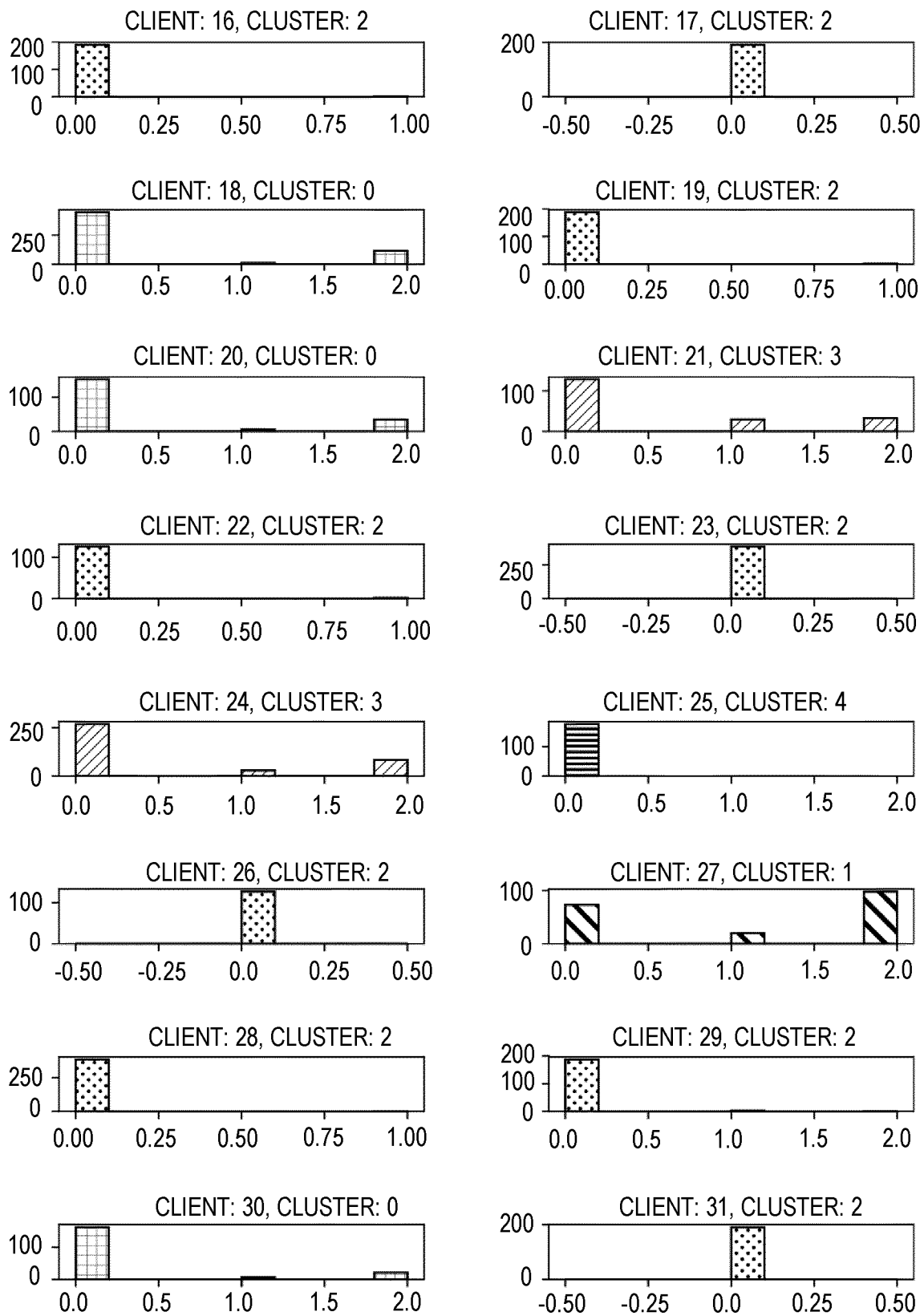

Some embodiments herein cluster the sites (clients) into different clusters, e.g., based on geographical location or other decencies, as shown for instance in FIGS. 18A-18B.

Some embodiments apply cluster-specific learning, e.g., such that the only sites (clients) that impact learning at other sites (clients) are those that are in the same cluster.

One or more embodiments extend federated learning (FL) such that the nodes will receive updated weights from all nodes and then choose amongst the weights the best combination to apply to receive the maximum accuracy. As a result, the edge sites each apply the model that fits the best to its needs. Towards this aim for further improvement in the accuracy, FIG. 19 shows the FL flow according to some embodiments.

The best combination of figuring out the proper weights can also be performed in the central node, and not necessarily in the edges.

Figure 19:
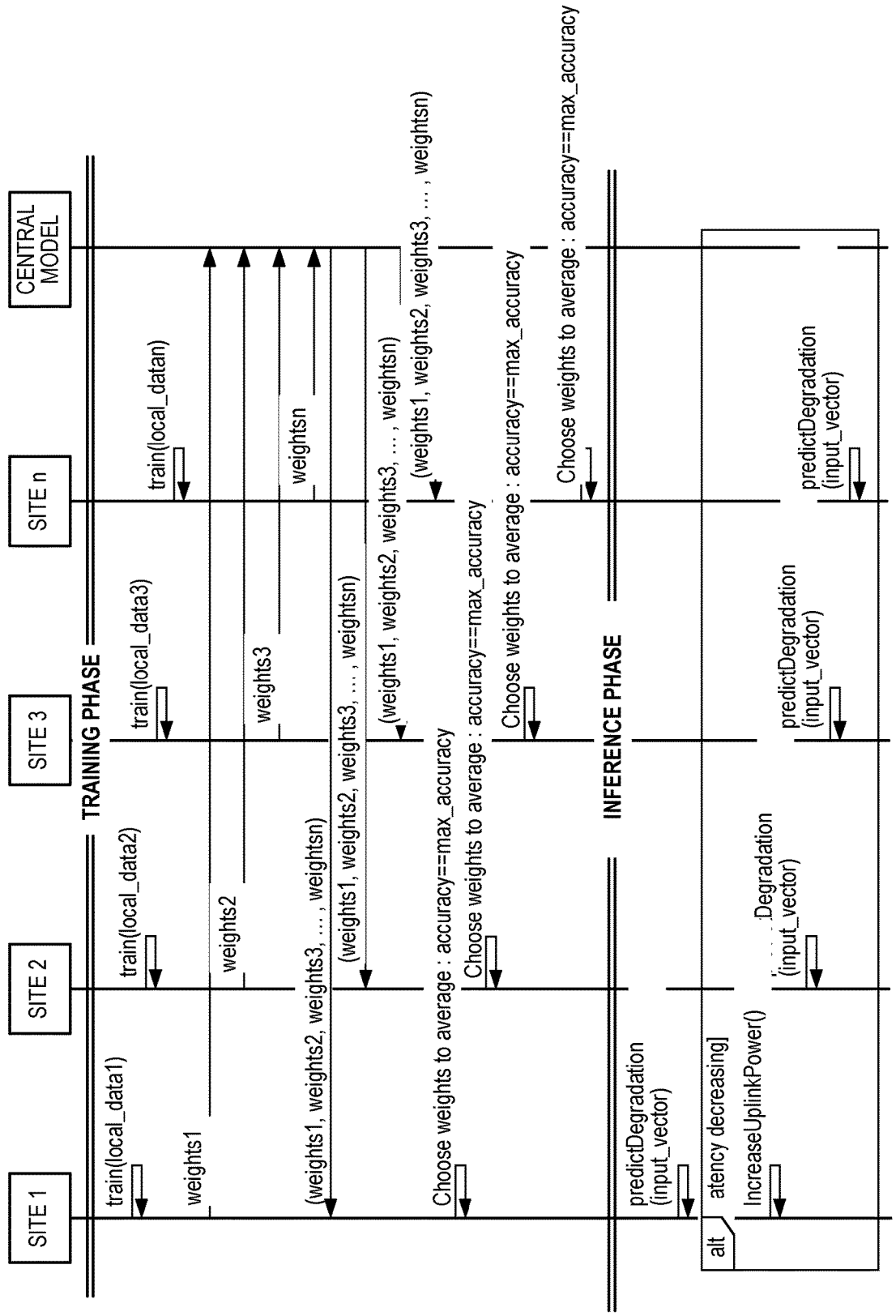
FIG. 19 is a call flow diagram showing federated learning according to some embodiments.

In the FL flow presented in FIG. 19, and assuming that the weight of any node can be any of the values in the set (0.0:1.0 where step size is 0.1), every node needs to compute a massive number of combinations, where N is the number of clients. In the use case mentioned above, since each side is a separate client, there are N=48 sites, where the combination can get to a massive number. This can be implemented in two different approaches: Reinforcement learning (RL) and genetic algorithm.

Using RL in the Edges

As grid search is highly computationally expensive, one approach that can be used is Reinforcement Learning (RL) to find out the best combination of weights in the edges. The aim is to maximize the edge performance with the minimum number of trials. Reinforcement learning proposed here is a continuous learning process that consists of a series of state, reward, and action.

The state: is the original input matrix, i.e., all the KPI instances, on the test set. The actions are taken randomly in an exploration phase and the corresponding rewards are collected.

The reward: is the accuracy metric as a result of averaging with the chosen weights from all edge nodes.

The cost: is the time it takes for trying out the weight in averaging as each trial is costly in time.

Figure 20:
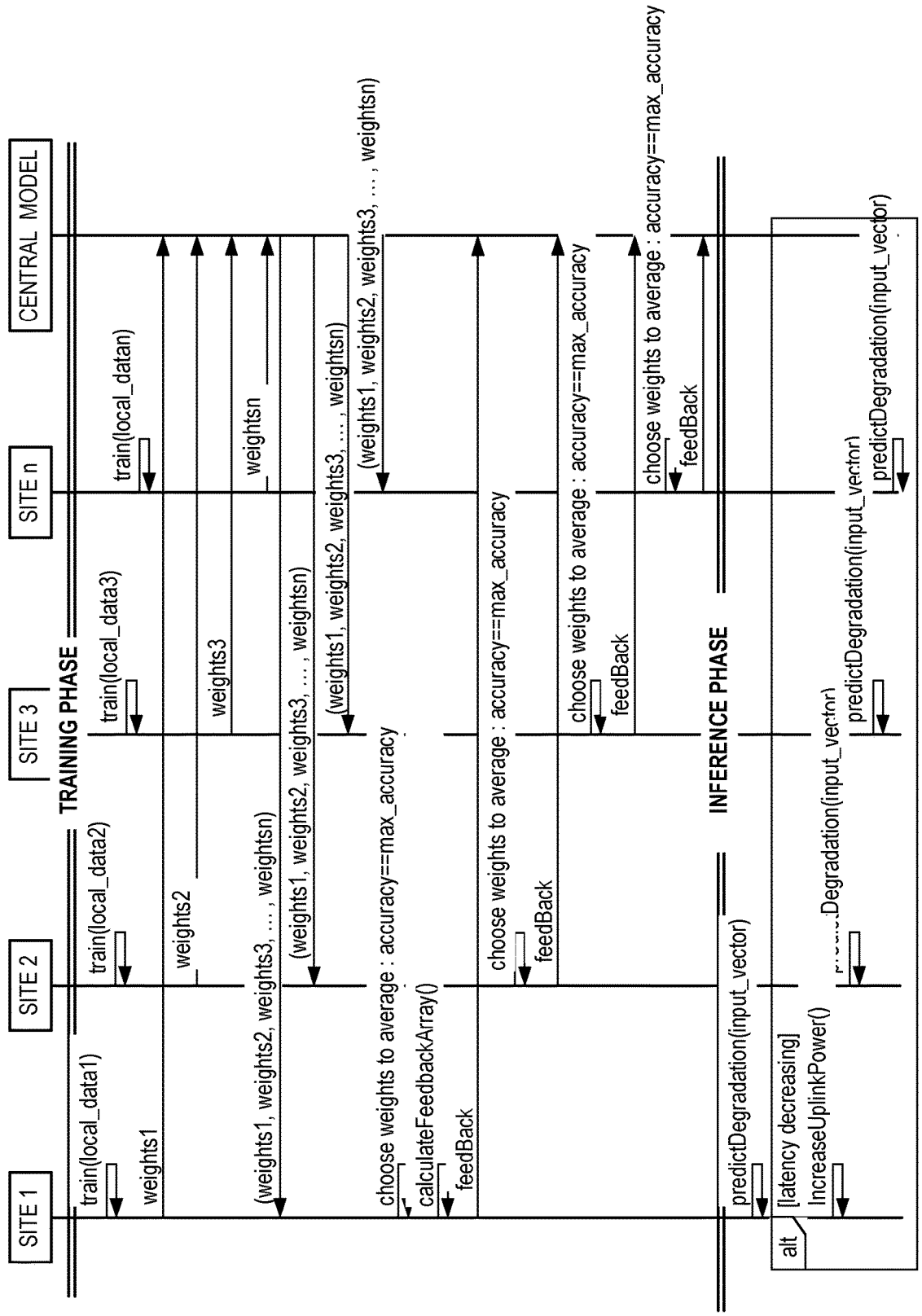
FIG. 20 is a call flow diagram showing federated learning according to other embodiments.

Alternatively or additionally, sites in some embodiments indicate whether they are interested in receiving more updates from other sites, e.g., since in certain cases further updates do not yield meaningful increases in accuracy. The sequence diagram in FIG. 20 illustrates how the introduction of such a feature affects the process proposed here.

feedbackArray can be as simple as a bitArray where each bit indicates if the recipients want to receive more feedback for the i-th site in the array. In a slightly different implementation, this array to be extended to contain floating point numbers indicating time units where information from i-th should not be communicated.

Genetic Algorithm

Genetic algorithm is an algorithm to find out a good and robust solution (combination). In this example, the interest is in finding the best combination of qualifier multiplied by different weights that offers the best accuracy. A genetic algorithm typically solves by trying different combinations of solutions from a population and then incrementally mutating (improving) intermediate solutions towards the most optimal based on its findings.

In some embodiments, the central node is the one transmitting the site-specific weights to each site. In other embodiments, the sites themselves are interconnected to share the weights between themselves without involvement of the central node, e.g., in a peer-to-peer fashion.

Some embodiments exploit site-specific context information associated with the received weights, where for instance the context information indicates characteristics of the site for which a set of weights is received (e.g., deployment environment, number of users, etc.). In this case, then, the central node may selectively consider (or give more weight to) for a given site the sets of weights that come from other sites that have characteristics similar to the site's own characteristics.

In some embodiments, the central node may be implemented in a core network of a wireless communication network. In other embodiments, the central node may be implemented at any node in the cloud, e.g., outside the wireless communication network.

Note that although some embodiments herein have been described in the context of KPI degradation in a telecom network, other embodiments are extendable to other contexts. Generally, then, according to some embodiments herein, the choice of which clients will receive which weights is made in the central node, e.g., with respect to their similarity on the compressed data distribution/signature. For example, a clustering technique is used to compute the similarity of nodes, and the averaging of weights is done based on this similarity. Alternatively, in other embodiments, the choice of which weights to use is done in the edge, where each client receives the weights that each other client computed, and then applies the best weight. Candidate algorithms to compute the best fit combination are reinforcement learning or genetic algorithms, e.g., if grid search or random search is too highly computationally expensive. In both embodiments, the central node may be involved to decrease the complexity, and keep track of the weights and accuracies.

Action on the edges: the clients in some embodiments send feedback to the central node at every round, stating the current accuracy of the models. In this case, the central node may not send anymore updated average weights if the site has already converged to a good accuracy score to reduce the signaling.

Figure 21:
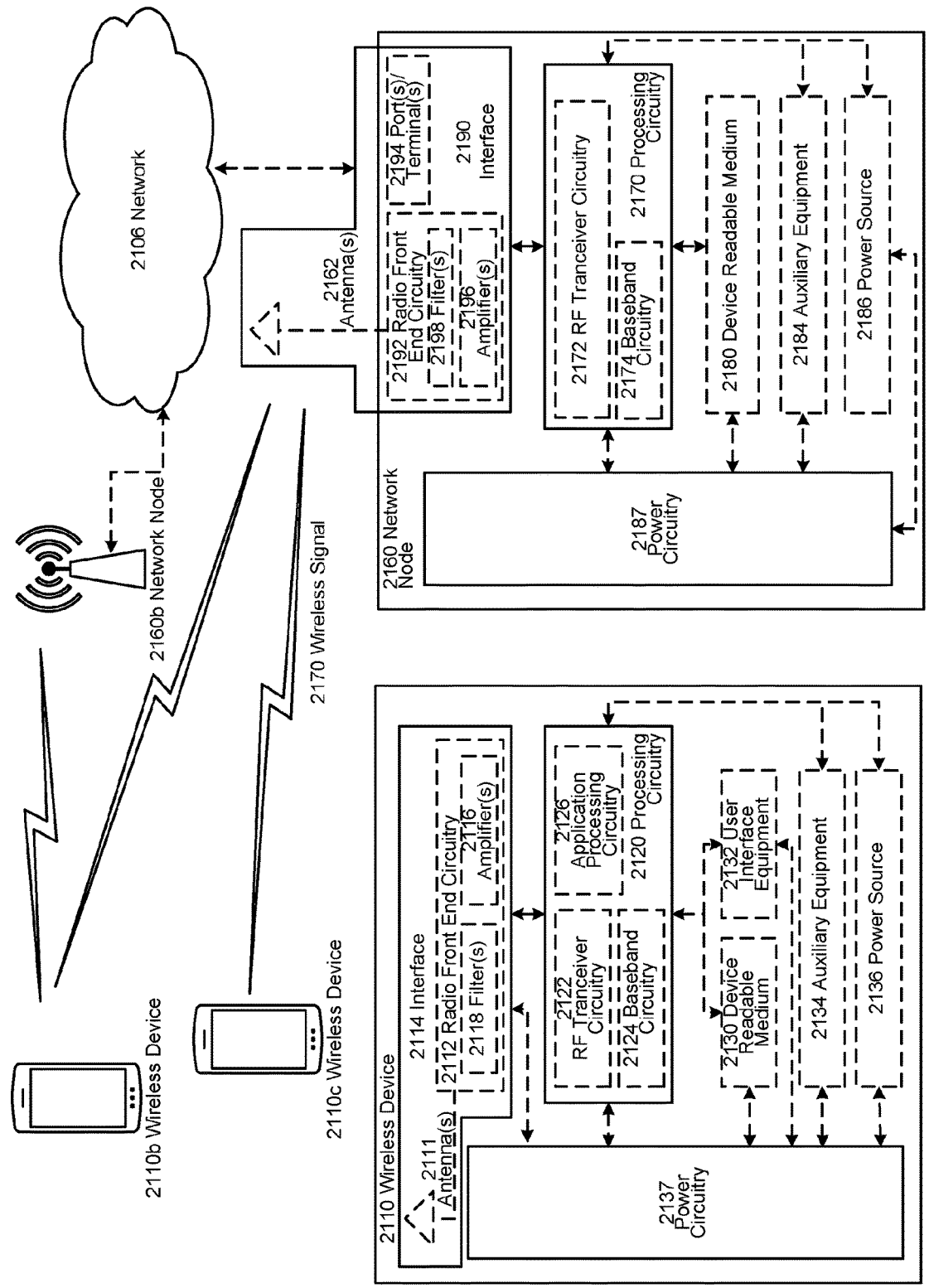
FIG. 21 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 2106, network nodes 2160 and 2160*b*, and WDs 2110, 2110*b*, and 2110*c*. In practice, a wireless network may further include any additional elements suitable to support communication between wireless devices or between a wireless device and another communication device, such as a landline telephone, a service provider, or any other network node or end device. Of the illustrated components, network node 2160 and wireless device (WD) 2110 are depicted with additional detail. The wireless network may provide communication and other types of services to one or more wireless devices to facilitate the wireless devices' access to and/or use of the services provided by, or via, the wireless network. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

In some embodiments, the site, edge node, or client as described herein may be implemented by network node 2160 or network node 2160*b*.

Network 2106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2160 and WD 2110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 2160 includes processing circuitry 2170, device readable medium 2180, interface 2190, auxiliary equipment 2184, power source 2186, power circuitry 2187, and antenna 2162. Although network node 2160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2160 are depicted as single boxes located within a larger box, or nested within multiple boxes, in practice, a network node may comprise multiple different physical components that make up a single illustrated component (e.g., device readable medium 2180 may comprise multiple separate hard drives as well as multiple RAM modules).

Similarly, network node 2160 may be composed of multiple physically separate components (e.g., a NodeB component and a RNC component, or a BTS component and a BSC component, etc.), which may each have their own respective components. In certain scenarios in which network node 2160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2160 may be configured to support multiple radio access technologies (RATs). In such embodiments, some components may be duplicated (e.g., separate device readable medium 2180 for the different RATs) and some components may be reused (e.g., the same antenna 2162 may be shared by the RATs). Network node 2160 may also include multiple sets of the various illustrated components for different wireless technologies integrated into network node 2160, such as, for example, GSM, WCDMA, LTE, NR, WiFi, or Bluetooth wireless technologies. These wireless technologies may be integrated into the same or different chip or set of chips and other components within network node 2160.

Processing circuitry 2170 is configured to perform any determining, calculating, or similar operations (e.g., certain obtaining operations) described herein as being provided by a network node. These operations performed by processing circuitry 2170 may include processing information obtained by processing circuitry 2170 by, for example, converting the obtained information into other information, comparing the obtained information or converted information to information stored in the network node, and/or performing one or more operations based on the obtained information or converted information, and as a result of said processing making a determination.

Processing circuitry 2170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2160 components, such as device readable medium 2180, network node 2160 functionality. For example, processing circuitry 2170 may execute instructions stored in device readable medium 2180 or in memory within processing circuitry 2170. Such functionality may include providing any of the various wireless features, functions, or benefits discussed herein. In some embodiments, processing circuitry 2170 may include a system on a chip (SOC).

In some embodiments, processing circuitry 2170 may include one or more of radio frequency (RF) transceiver circuitry 2172 and baseband processing circuitry 2174. In some embodiments, radio frequency (RF) transceiver circuitry 2172 and baseband processing circuitry 2174 may be on separate chips (or sets of chips), boards, or units, such as radio units and digital units. In alternative embodiments, part or all of RF transceiver circuitry 2172 and baseband processing circuitry 2174 may be on the same chip or set of chips, boards, or units In certain embodiments, some or all of the functionality described herein as being provided by a network node, base station, eNB or other such network device may be performed by processing circuitry 2170 executing instructions stored on device readable medium 2180 or memory within processing circuitry 2170. In alternative embodiments, some or all of the functionality may be provided by processing circuitry 2170 without executing instructions stored on a separate or discrete device readable medium, such as in a hard-wired manner. In any of those embodiments, whether executing instructions stored on a device readable storage medium or not, processing circuitry 2170 can be configured to perform the described functionality. The benefits provided by such functionality are not limited to processing circuitry 2170 alone or to other components of network node 2160, but are enjoyed by network node 2160 as a whole, and/or by end users and the wireless network generally.

Device readable medium 2180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2170. Device readable medium 2180 may store any suitable instructions, data or information, including a computer program, software, an application including one or more of logic, rules, code, tables, etc. and/or other instructions capable of being executed by processing circuitry 2170 and, utilized by network node 2160. Device readable medium 2180 may be used to store any calculations made by processing circuitry 2170 and/or any data received via interface 2190. In some embodiments, processing circuitry 2170 and device readable medium 2180 may be considered to be integrated.

Interface 2190 is used in the wired or wireless communication of signalling and/or data between network node 2160, network 2106, and/or WDs 2110. As illustrated, interface 2190 comprises port(s)/terminal(s) 2194 to send and receive data, for example to and from network 2106 over a wired connection. Interface 2190 also includes radio front end circuitry 2192 that may be coupled to, or in certain embodiments a part of, antenna 2162. Radio front end circuitry 2192 comprises filters 2198 and amplifiers 2196. Radio front end circuitry 2192 may be connected to antenna 2162 and processing circuitry 2170. Radio front end circuitry may be configured to condition signals communicated between antenna 2162 and processing circuitry 2170. Radio front end circuitry 2192 may receive digital data that is to be sent out to other network nodes or WDs via a wireless connection. Radio front end circuitry 2192 may convert the digital data into a radio signal having the appropriate channel and bandwidth parameters using a combination of filters 2198 and/or amplifiers 2196. The radio signal may then be transmitted via antenna 2162. Similarly, when receiving data, antenna 2162 may collect radio signals which are then converted into digital data by radio front end circuitry 2192. The digital data may be passed to processing circuitry 2170. In other embodiments, the interface may comprise different components and/or different combinations of components.

In certain alternative embodiments, network node 2160 may not include separate radio front end circuitry 2192, instead, processing circuitry 2170 may comprise radio front end circuitry and may be connected to antenna 2162 without separate radio front end circuitry 2192. Similarly, in some embodiments, all or some of RF transceiver circuitry 2172 may be considered a part of interface 2190. In still other embodiments, interface 2190 may include one or more ports or terminals 2194, radio front end circuitry 2192, and RF transceiver circuitry 2172, as part of a radio unit (not shown), and interface 2190 may communicate with baseband processing circuitry 2174, which is part of a digital unit (not shown).

Antenna 2162 may include one or more antennas, or antenna arrays, configured to send and/or receive wireless signals. Antenna 2162 may be coupled to radio front end circuitry 2190 and may be any type of antenna capable of transmitting and receiving data and/or signals wirelessly. In some embodiments, antenna 2162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2162 may be separate from network node 2160 and may be connectable to network node 2160 through an interface or port.

Antenna 2162, interface 2190, and/or processing circuitry 2170 may be configured to perform any receiving operations and/or certain obtaining operations described herein as being performed by a network node. Any information, data and/or signals may be received from a wireless device, another network node and/or any other network equipment. Similarly, antenna 2162, interface 2190, and/or processing circuitry 2170 may be configured to perform any transmitting operations described herein as being performed by a network node. Any information, data and/or signals may be transmitted to a wireless device, another network node and/or any other network equipment.

Power circuitry 2187 may comprise, or be coupled to, power management circuitry and is configured to supply the components of network node 2160 with power for performing the functionality described herein. Power circuitry 2187 may receive power from power source 2186. Power source 2186 and/or power circuitry 2187 may be configured to provide power to the various components of network node 2160 in a form suitable for the respective components (e.g., at a voltage and current level needed for each respective component). Power source 2186 may either be included in, or external to, power circuitry 2187 and/or network node 2160. For example, network node 2160 may be connectable to an external power source (e.g., an electricity outlet) via an input circuitry or interface such as an electrical cable, whereby the external power source supplies power to power circuitry 2187. As a further example, power source 2186 may comprise a source of power in the form of a battery or battery pack which is connected to, or integrated in, power circuitry 2187. The battery may provide backup power should the external power source fail. Other types of power sources, such as photovoltaic devices, may also be used.

Alternative embodiments of network node 2160 may include additional components beyond those shown in FIG. 21 that may be responsible for providing certain aspects of the network node's functionality, including any of the functionality described herein and/or any functionality necessary to support the subject matter described herein. For example, network node 2160 may include user interface equipment to allow input of information into network node 2160 and to allow output of information from network node 2160. This may allow a user to perform diagnostic, maintenance, repair, and other administrative functions for network node 2160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2110 includes antenna 2111, interface 2114, processing circuitry 2120, device readable medium 2130, user interface equipment 2132, auxiliary equipment 2134, power source 2136 and power circuitry 2137. WD 2110 may include multiple sets of one or more of the illustrated components for different wireless technologies supported by WD 2110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2110.

Antenna 2111 may include one or more antennas or antenna arrays, configured to send and/or receive wireless signals, and is connected to interface 2114. In certain alternative embodiments, antenna 2111 may be separate from WD 2110 and be connectable to WD 2110 through an interface or port. Antenna 2111, interface 2114, and/or processing circuitry 2120 may be configured to perform any receiving or transmitting operations described herein as being performed by a WD. Any information, data and/or signals may be received from a network node and/or another WD. In some embodiments, radio front end circuitry and/or antenna 2111 may be considered an interface.

As illustrated, interface 2114 comprises radio front end circuitry 2112 and antenna 2111. Radio front end circuitry 2112 comprise one or more filters 2118 and amplifiers 2116. Radio front end circuitry 2114 is connected to antenna 2111 and processing circuitry 2120, and is configured to condition signals communicated between antenna 2111 and processing circuitry 2120. Radio front end circuitry 2112 may be coupled to or a part of antenna 2111. In some embodiments, WD 2110 may not include separate radio front end circuitry 2112; rather, processing circuitry 2120 may comprise radio front end circuitry and may be connected to antenna 2111. Similarly, in some embodiments, some or all of RF transceiver circuitry 2122 may be considered a part of interface 2114. Radio front end circuitry 2112 may receive digital data that is to be sent out to other network nodes or WDs via a wireless connection. Radio front end circuitry 2112 may convert the digital data into a radio signal having the appropriate channel and bandwidth parameters using a combination of filters 2118 and/or amplifiers 2116. The radio signal may then be transmitted via antenna 2111. Similarly, when receiving data, antenna 2111 may collect radio signals which are then converted into digital data by radio front end circuitry 2112. The digital data may be passed to processing circuitry 2120. In other embodiments, the interface may comprise different components and/or different combinations of components.

Processing circuitry 2120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2110 components, such as device readable medium 2130, WD 2110 functionality. Such functionality may include providing any of the various wireless features or benefits discussed herein. For example, processing circuitry 2120 may execute instructions stored in device readable medium 2130 or in memory within processing circuitry 2120 to provide the functionality disclosed herein.

As illustrated, processing circuitry 2120 includes one or more of RF transceiver circuitry 2122, baseband processing circuitry 2124, and application processing circuitry 2126. In other embodiments, the processing circuitry may comprise different components and/or different combinations of components. In certain embodiments processing circuitry 2120 of WD 2110 may comprise a SOC. In some embodiments, RF transceiver circuitry 2122, baseband processing circuitry 2124, and application processing circuitry 2126 may be on separate chips or sets of chips. In alternative embodiments, part or all of baseband processing circuitry 2124 and application processing circuitry 2126 may be combined into one chip or set of chips, and RF transceiver circuitry 2122 may be on a separate chip or set of chips. In still alternative embodiments, part or all of RF transceiver circuitry 2122 and baseband processing circuitry 2124 may be on the same chip or set of chips, and application processing circuitry 2126 may be on a separate chip or set of chips. In yet other alternative embodiments, part or all of RF transceiver circuitry 2122, baseband processing circuitry 2124, and application processing circuitry 2126 may be combined in the same chip or set of chips. In some embodiments, RF transceiver circuitry 2122 may be a part of interface 2114. RF transceiver circuitry 2122 may condition RF signals for processing circuitry 2120.

In certain embodiments, some or all of the functionality described herein as being performed by a WD may be provided by processing circuitry 2120 executing instructions stored on device readable medium 2130, which in certain embodiments may be a computer-readable storage medium. In alternative embodiments, some or all of the functionality may be provided by processing circuitry 2120 without executing instructions stored on a separate or discrete device readable storage medium, such as in a hard-wired manner. In any of those particular embodiments, whether executing instructions stored on a device readable storage medium or not, processing circuitry 2120 can be configured to perform the described functionality. The benefits provided by such functionality are not limited to processing circuitry 2120 alone or to other components of WD 2110, but are enjoyed by WD 2110 as a whole, and/or by end users and the wireless network generally.

Processing circuitry 2120 may be configured to perform any determining, calculating, or similar operations (e.g., certain obtaining operations) described herein as being performed by a WD. These operations, as performed by processing circuitry 2120, may include processing information obtained by processing circuitry 2120 by, for example, converting the obtained information into other information, comparing the obtained information or converted information to information stored by WD 2110, and/or performing one or more operations based on the obtained information or converted information, and as a result of said processing making a determination.

Device readable medium 2130 may be operable to store a computer program, software, an application including one or more of logic, rules, code, tables, etc. and/or other instructions capable of being executed by processing circuitry 2120. Device readable medium 2130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2120. In some embodiments, processing circuitry 2120 and device readable medium 2130 may be considered to be integrated.

User interface equipment 2132 may provide components that allow for a human user to interact with WD 2110. Such interaction may be of many forms, such as visual, audial, tactile, etc. User interface equipment 2132 may be operable to produce output to the user and to allow the user to provide input to WD 2110. The type of interaction may vary depending on the type of user interface equipment 2132 installed in WD 2110. For example, if WD 2110 is a smart phone, the interaction may be via a touch screen; if WD 2110 is a smart meter, the interaction may be through a screen that provides usage (e.g., the number of gallons used) or a speaker that provides an audible alert (e.g., if smoke is detected). User interface equipment 2132 may include input interfaces, devices and circuits, and output interfaces, devices and circuits. User interface equipment 2132 is configured to allow input of information into WD 2110, and is connected to processing circuitry 2120 to allow processing circuitry 2120 to process the input information. User interface equipment 2132 may include, for example, a microphone, a proximity or other sensor, keys/buttons, a touch display, one or more cameras, a USB port, or other input circuitry. User interface equipment 2132 is also configured to allow output of information from WD 2110, and to allow processing circuitry 2120 to output information from WD 2110. User interface equipment 2132 may include, for example, a speaker, a display, vibrating circuitry, a USB port, a headphone interface, or other output circuitry. Using one or more input and output interfaces, devices, and circuits, of user interface equipment 2132, WD 2110 may communicate with end users and/or the wireless network, and allow them to benefit from the functionality described herein.

Auxiliary equipment 2134 is operable to provide more specific functionality which may not be generally performed by WDs. This may comprise specialized sensors for doing measurements for various purposes, interfaces for additional types of communication such as wired communications etc. The inclusion and type of components of auxiliary equipment 2134 may vary depending on the embodiment and/or scenario.

Power source 2136 may, in some embodiments, be in the form of a battery or battery pack. Other types of power sources, such as an external power source (e.g., an electricity outlet), photovoltaic devices or power cells, may also be used. WD 2110 may further comprise power circuitry 2137 for delivering power from power source 2136 to the various parts of WD 2110 which need power from power source 2136 to carry out any functionality described or indicated herein. Power circuitry 2137 may in certain embodiments comprise power management circuitry. Power circuitry 2137 may additionally or alternatively be operable to receive power from an external power source; in which case WD 2110 may be connectable to the external power source (such as an electricity outlet) via input circuitry or an interface such as an electrical power cable. Power circuitry 2137 may also in certain embodiments be operable to deliver power from an external power source to power source 2136. This may be, for example, for the charging of power source 2136. Power circuitry 2137 may perform any formatting, converting, or other modification to the power from power source 2136 to make the power suitable for the respective components of WD 2110 to which power is supplied.

Figure 22:
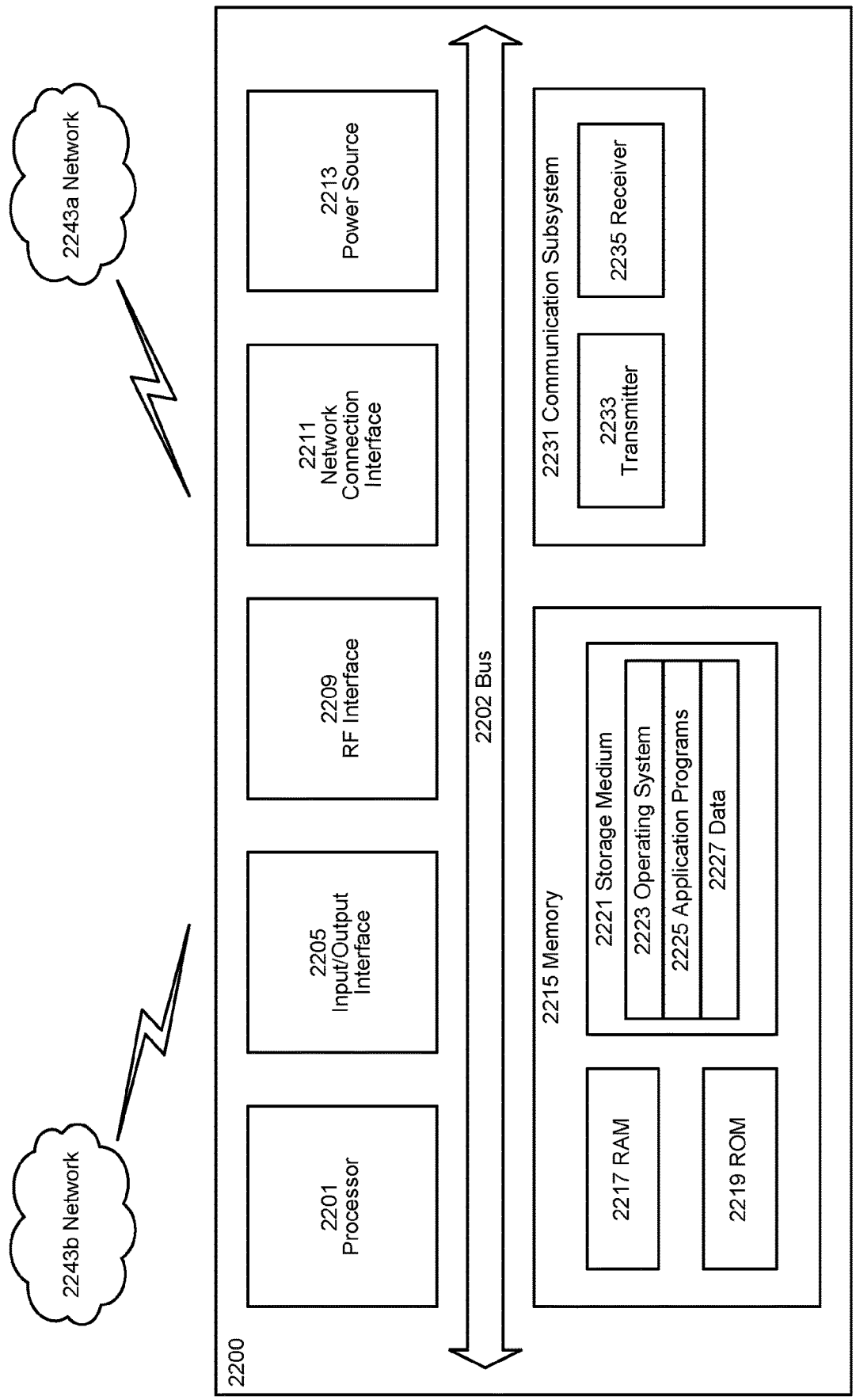
FIG. 22 is a block diagram of a user equipment according to some embodiments.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 22200 may be any UE identified by the $3^{rd}$ Generation Partnership Project (3GPP), including a NB-IoT UE, a machine type communication (MTC) UE, and/or an enhanced MTC (eMTC) UE. UE 2200, as illustrated in FIG. 22, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE 2200 includes processing circuitry 2201 that is operatively coupled to input/output interface 2205, radio frequency (RF) interface 2209, network connection interface 2211, memory 2215 including random access memory (RAM) 2217, read-only memory (ROM) 2219, and storage medium 2221 or the like, communication subsystem 2231, power source 2233, and/or any other component, or any combination thereof. Storage medium 2221 includes operating system 2223, application program 2225, and data 2227. In other embodiments, storage medium 2221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry 2201 may be configured to process computer instructions and data. Processing circuitry 2201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2201 may include two central processing units (CPUs). Data may be information in a form suitable for use by a computer.

In the depicted embodiment, input/output interface 2205 may be configured to provide a communication interface to an input device, output device, or input and output device. UE 2200 may be configured to use an output device via input/output interface 2205. An output device may use the same type of interface port as an input device. For example, a USB port may be used to provide input to and output from UE 2200. The output device may be a speaker, a sound card, a video card, a display, a monitor, a printer, an actuator, an emitter, a smartcard, another output device, or any combination thereof. UE 2200 may be configured to use an input device via input/output interface 2205 to allow a user to capture information into UE 2200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface 2209 may be configured to provide a communication interface to RF components such as a transmitter, a receiver, and an antenna. Network connection interface 2211 may be configured to provide a communication interface to network 2243a. Network 2243a may encompass wired and/or wireless networks such as a local-area network (LAN), a wide-area network (WAN), a computer network, a wireless network, a telecommunications network, another like network or any combination thereof. For example, network 2243a may comprise a Wi-Fi network. Network connection interface 2211 may be configured to include a receiver and a transmitter interface used to communicate with one or more other devices over a communication network according to one or more communication protocols, such as Ethernet, TCP/IP, SONET, ATM, or the like. Network connection interface 2211 may implement receiver and transmitter functionality appropriate to the communication network links (e.g., optical, electrical, and the like). The transmitter and receiver functions may share circuit components, software or firmware, or alternatively may be implemented separately.

RAM 2217 may be configured to interface via bus 2202 to processing circuitry 2201 to provide storage or caching of data or computer instructions during the execution of software programs such as the operating system, application programs, and device drivers. ROM 2219 may be configured to provide computer instructions or data to processing circuitry 2201. For example, ROM 2219 may be configured to store invariant low-level system code or data for basic system functions such as basic input and output (I/O), startup, or reception of keystrokes from a keyboard that are stored in a non-volatile memory. Storage medium 2221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2221 may be configured to include operating system 2223, application program 2225 such as a web browser application, a widget or gadget engine or another application, and data file 2227. Storage medium 2221 may store, for use by UE 2200, any of a variety of various operating systems or combinations of operating systems.

Storage medium 2221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2221 may allow UE 2200 to access computer-executable instructions, application programs or the like, stored on transitory or non-transitory memory media, to off-load data, or to upload data. An article of manufacture, such as one utilizing a communication system may be tangibly embodied in storage medium 2221, which may comprise a device readable medium.

In FIG. 22, processing circuitry 2201 may be configured to communicate with network 2243b using communication subsystem 2231. Network 2243a and network 2243b may be the same network or networks or different network or networks. Communication subsystem 2231 may be configured to include one or more transceivers used to communicate with network 2243b. For example, communication subsystem 2231 may be configured to include one or more transceivers used to communicate with one or more remote transceivers of another device capable of wireless communication such as another WD, UE, or base station of a radio access network (RAN) according to one or more communication protocols, such as IEEE 802.22, CDMA, WCDMA, GSM, LTE, UTRAN, WiMax, or the like. Each transceiver may include transmitter 2233 and/or receiver 2235 to implement transmitter or receiver functionality, respectively, appropriate to the RAN links (e.g., frequency allocations and the like). Further, transmitter 2233 and receiver 2235 of each transceiver may share circuit components, software or firmware, or alternatively may be implemented separately.

In the illustrated embodiment, the communication functions of communication subsystem 2231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2231 may include cellular communication, Wi-Fi communication, Bluetooth communication, and GPS communication. Network 2243b may encompass wired and/or wireless networks such as a local-area network (LAN), a wide-area network (WAN), a computer network, a wireless network, a telecommunications network, another like network or any combination thereof. For example, network 2243b may be a cellular network, a Wi-Fi network, and/or a near-field network. Power source 2213 may be configured to provide alternating current (AC) or direct current (DC) power to components of UE 2200.

The features, benefits and/or functions described herein may be implemented in one of the components of UE 2200 or partitioned across multiple components of UE 2200. Further, the features, benefits, and/or functions described herein may be implemented in any combination of hardware, software or firmware. In one example, communication subsystem 2231 may be configured to include any of the components described herein. Further, processing circuitry 2201 may be configured to communicate with any of such components over bus 2202. In another example, any of such components may be represented by program instructions stored in memory that when executed by processing circuitry 2201 perform the corresponding functions described herein. In another example, the functionality of any of such components may be partitioned between processing circuitry 2201 and communication subsystem 2231. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. An edge node configured for use in an edge communication network and for using federated learning to predict network communication performance at the edge node, the edge node comprising:
    communication circuitry; and
    processing circuitry configured to:
        train a local model of network communication performance over multiple rounds of training at the edge node, based on a local training dataset at the edge node and based on multi-node training information received in each round of training, wherein the multi-node training information comprises information about local models at other respective edge nodes as trained based on local training datasets at the other edge nodes;
        after or as part of each round of training, transmit control signaling that indicates an accuracy of the local model as trained by the edge node through that round of training, that indicates whether another round of training is needed or desired at the edge node, and/or that indicates whether any further multi-node training information is needed or desired at the edge node;
        predict network communication performance at the edge node based on the trained local model; and
        perform one or more remedial or preventative measures to account for the network communication performance at the edge node being predicted to decrease.

2. The edge node of claim 1, wherein the control signaling indicates whether another round of training is needed or desired at the edge node and/or indicates whether any further update information is needed or desired at the edge node.

3. The edge node of claim 2, the processing circuitry further configured to, for each of the multiple rounds of training:
    determine, based on at least the accuracy of the local model as trained by the edge node through that round of training, whether one or more conditions are met for stopping training of the local model at the edge node; and
    generate the control signaling to indicate that another round of training and/or further update information is not, or is, needed or desired at the edge node, depending respectively on whether or not the one or more conditions are met.

4. The edge node of claim 3, wherein the one or more conditions include the accuracy of the local model reaching an accuracy threshold and/or improving by less than a minimum incremental improvement threshold since one or more previous rounds of training.

5. The edge node of claim 2, wherein the control signaling indicates that the edge node does not need or desire another round of training and/or any further update information and further indicates for how long the edge node does not need or desire another round of training and/or any further update information.

6. The edge node of claim 1, wherein the control signaling indicates an accuracy of the local model as trained by the edge node through that round of training, wherein the control signaling indicates the accuracy of the local model with respect to a local test dataset at the edge node.

7. The edge node of claim 1, wherein the multi-node training information includes a combination of local updates that the other edge nodes respectively made to local models at the other edge nodes.

8. The edge node of claim 1, wherein the multi-node training information includes, for each of multiple other edge nodes, a local update that the other edge node made to a local model at the other edge node, and wherein, for each of the multiple rounds of training, the processing circuitry is configured to:
    decide which one or more of the local updates to combine with one another, and/or with a local update determined by the edge node based on the local training dataset at the edge node, into a combined update, and
    update the local model at the edge node based on the combined update.

9. The edge node of claim 1, wherein the processing circuitry is configured to perform one or more remedial or preventative measures by adjusting a transmission power of the edge node.

10. The edge node of claim 1, wherein the local model at the edge node is a model of a predicted level of degradation in one or more key performance indicators that indicate network communication performance in the edge communication network.

11. The edge node of claim 10, wherein the local model at the edge node maps the one or more key performance indicators as input to an output in the form of a multiclass label that represents the predicted level of degradation in the one or more key performance indicators, wherein the multiclass label has multiple possible values associated with different predicted levels of degradation in the one or more key performance indicators.

12. The edge node of claim 1, wherein the local model at the edge node and the local models at the other edge nodes are each a neural network model, and wherein a local update to a neural network model includes an updated weight matrix.

13. A server for coordinating training of local models of network communication performance at respective edge nodes, the server comprising:
communication circuitry; and
processing circuitry configured to, for each of multiple rounds of training:
transmit, to one or more of the edge nodes, multi-node training information that comprises information about local models at respective edge nodes as trained based on local training datasets at the edge nodes; and
receive, from one or more of the edge nodes, control signaling that indicates an accuracy of the local model at the edge node as trained through the round of training, that indicates whether another round of training is needed or desired at the edge node, and/or that indicates whether any further multi-node training information is needed or desired at the edge node; and
control generation of or transmission of multi-node training information in any next round of training based on the received control signaling.

14. The server of claim 13, wherein the control signaling indicates whether another round of training is needed or desired at the edge node and/or indicates whether any further update information is needed or desired at the edge node.

15. The server of claim 13, wherein the control signaling indicates that the edge node does not need or desire another round of training and/or any further update information and further indicates for how long the edge node does not need or desire another round of training and/or any further update information.

16. The server of claim 13, wherein the processing circuitry is configured to control generation of or transmission of multi-node training information by transmitting or not transmitting multi-node training information to an edge node in a next round of training, depending respectively on whether or not the control signaling from the edge node indicates that the edge node needs or desires the further multi-node training information or another round of training.

17. The server of claim 13, wherein the control signaling indicates the accuracy of the local model at the edge node as trained through the round of training, and wherein the processing circuitry is configured to control generation of or transmission of multi-node training information by:
determining, based on at least the accuracy indicated by the control signaling received from an edge node, whether one or more conditions are met for stopping training of the local model at the edge node; and
refraining from transmitting, or transmitting, further multi-node training information to the edge node in a next round of training, depending respectively on whether or not the one or more conditions are met.

18. The server of claim 17, wherein the one or more conditions include the accuracy of the local model reaching an accuracy threshold and/or improving by less than a minimum incremental improvement threshold since one or more previous rounds of training.

19. A method for using federated learning to predict network communication performance at an edge node in an edge communication network, the method performed by the edge node and comprising:
training a local model of network communication performance over multiple rounds of training at the edge node, based on a local training dataset at the edge node and based on multi-node training information received in each round of training, wherein the multi-node training information comprises information about local models at other respective edge nodes as trained based on local training datasets at the other edge nodes;
after or as part of each round of training, transmitting control signaling that indicates an accuracy of the local model as trained by the edge node through that round of training, that indicates whether another round of training is needed or desired at the edge node, and/or that indicates whether any further multi-node training information is needed or desired at the edge node;
predicting network communication performance at the edge node based on the trained local model; and
performing one or more remedial or preventative measures to account for the network communication performance at the edge node being predicted to decrease.

20. A method performed by a server for coordinating training of local models of network communication performance at respective edge nodes, the method comprising, for each of multiple rounds of training:
transmitting, to one or more of the edge nodes, multi-node training information that comprises information about local models at respective edge nodes as trained based on local training datasets at the edge nodes; and
receiving, from one or more of the edge nodes, control signaling that indicates an accuracy of the local model at the edge node as trained through the round of training, that indicates whether another round of training is needed or desired at the edge node, and/or that indicates whether any further multi-node training information is needed or desired at the edge node; and
controlling generation of or transmission of multi-node training information in any next round of training based on the received control signaling.

* * * * *